(12) United States Patent
Kim

(10) Patent No.: US 10,945,023 B2
(45) Date of Patent: Mar. 9, 2021

(54) DIGITAL DEVICE AND METHOD OF PROCESSING DATA IN SAID DIGITAL DEVICE

(71) Applicant: LG ELECTRONICS INC., Seoul (KR)

(72) Inventor: Haeryong Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/751,979

(22) PCT Filed: Aug. 23, 2016

(86) PCT No.: PCT/KR2016/009315
§ 371 (c)(1),
(2) Date: Feb. 12, 2018

(87) PCT Pub. No.: WO2017/034298
PCT Pub. Date: Mar. 2, 2017

(65) Prior Publication Data
US 2018/0234723 A1 Aug. 16, 2018

(30) Foreign Application Priority Data
Aug. 26, 2015 (KR) .................. 10-2015-0120400

(51) Int. Cl.
*H04N 21/431* (2011.01)
*H04N 21/472* (2011.01)
(Continued)

(52) U.S. Cl.
CPC ......... *H04N 21/4314* (2013.01); *H04N 5/445* (2013.01); *H04N 21/4316* (2013.01);
(Continued)

(58) Field of Classification Search
CPC .... H04N 21/4314; H04N 21/47; H04N 5/445; H04N 21/4316; H04N 21/8173; H04N 21/812; H04N 21/472
See application file for complete search history.

(56) References Cited

U.S. PATENT DOCUMENTS 6,177,931 B1 * 1/2001 Alexander ......... G06Q 30/0269
348/565
2002/0056083 A1 * 5/2002 Istvan .................... H04N 7/163
725/1
(Continued)

FOREIGN PATENT DOCUMENTS

JP 2010-257228 A 11/2010
KR 10-2007-0081575 A 8/2007
(Continued)

*Primary Examiner* — Nathan J Flynn
*Assistant Examiner* — Christine A Kurien
(74) *Attorney, Agent, or Firm* — Birch, Stewart, Kolasch & Birch, LLP

(57) ABSTRACT

In the present specification, various embodiments are disclosed of digital devices and methods of processing data in said digital devices. Here, a digital device according to an embodiment of the present invention comprises: a user interface unit for receiving execution requests for a first application through to a fourth application; a decoder for decoding data on the applications for which the execution requests were made; a control unit; and an output unit for outputting first through to third display windows and application data in each of the display windows. The control unit controls the execution of the first application; divides a screen according to the second application execution request; implements controlling to generate a first display window and a second display window for the divided screen and output the first application data and the second application data in the first display window and the second display window, respectively; implements controlling to
(Continued)

output the third application data in the second display window in which the second application data is being output, when the third application execution request is received; and implements controlling to further divide the screen, generate a third display window for the further divided screen, and output the fourth application data in the third display window, when the fourth application execution request is received and the fourth application data is related to the third application data.

18 Claims, 29 Drawing Sheets

(51) Int. Cl.
    *H04N 5/445*     (2011.01)
    *H04N 21/81*     (2011.01)
    *H04N 21/47*     (2011.01)

(52) U.S. Cl.
    CPC ........... *H04N 21/47* (2013.01); *H04N 21/472* (2013.01); *H04N 21/812* (2013.01); *H04N 21/8173* (2013.01)

(56) References Cited

U.S. PATENT DOCUMENTS

| | | | | |
|---|---|---|---|---|
| 2008/0278628 | A1* | 11/2008 | Hirata | H04N 21/4438 348/564 |
| 2010/0007796 | A1* | 1/2010 | Yamaji | H04N 5/23219 348/588 |
| 2014/0071236 | A1* | 3/2014 | Tsukagoshi | H04N 21/236 348/43 |
| 2015/0301777 | A1* | 10/2015 | Jang | G06F 3/14 345/169 |
| 2015/0341598 | A1* | 11/2015 | Wu | H04N 7/181 348/564 |

FOREIGN PATENT DOCUMENTS

| | | |
|---|---|---|
| KR | 10-2013-0057588 A | 6/2013 |
| KR | 10-2015-0048660 A | 5/2015 |
| KR | 10-2015-0081040 A | 7/2015 |

* cited by examiner

FIG. 20
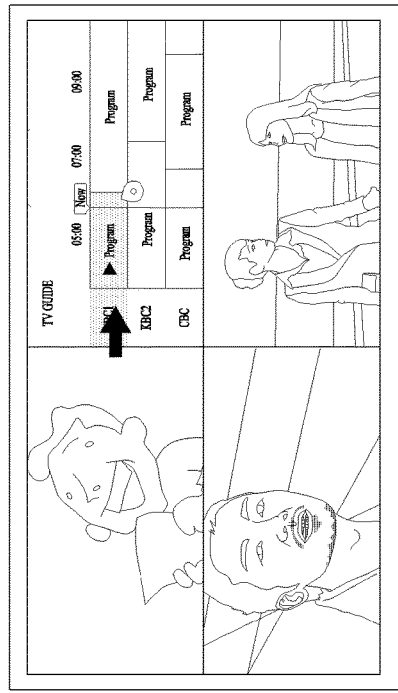
(a)
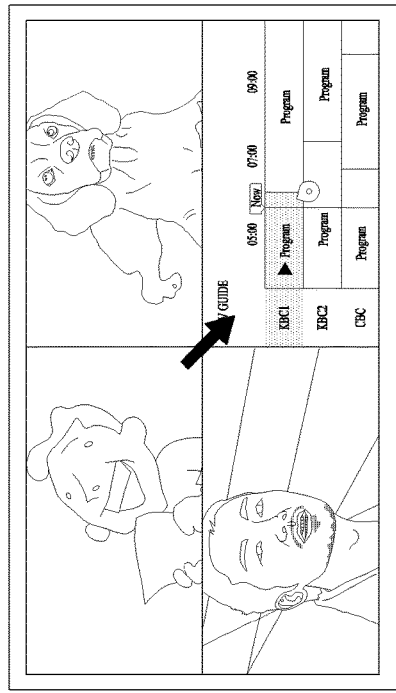
(b)
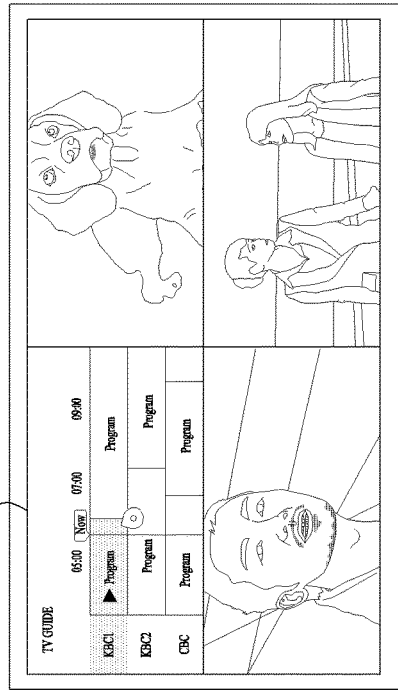
(c)
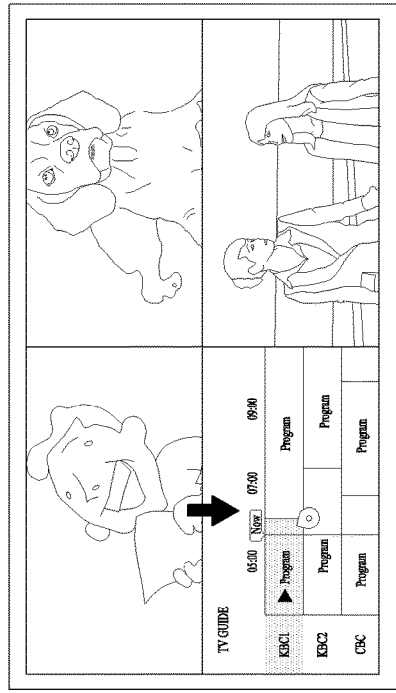
(d)

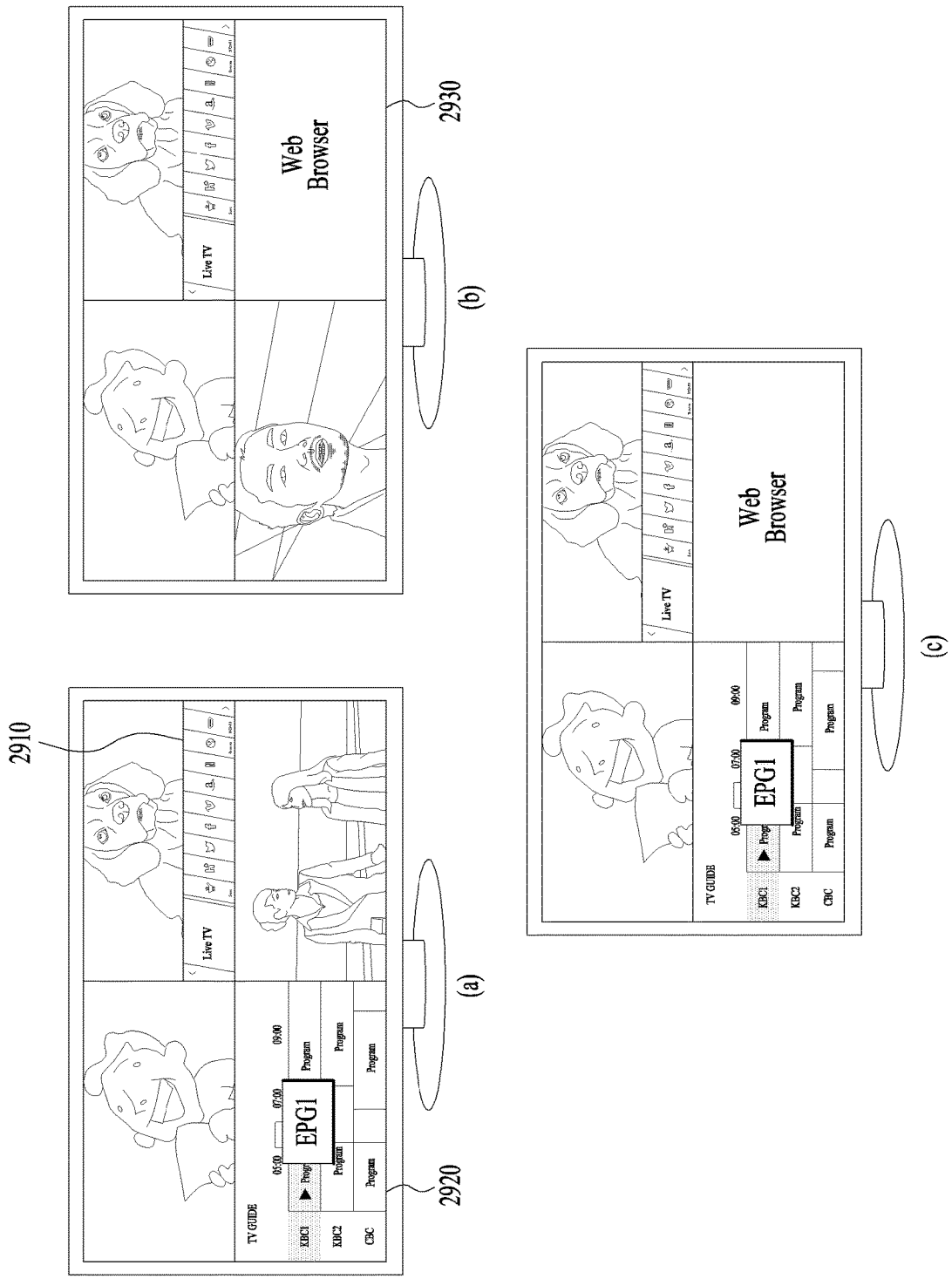

DIGITAL DEVICE AND METHOD OF PROCESSING DATA IN SAID DIGITAL DEVICE

CROSS REFERENCE TO RELATED APPLICATIONS

This application is the National Phase of PCT International Application No. PCT/KR2016/009315, filed on Aug. 23, 2016, which claims priority under 35 U.S.C. 119(a) to Patent Application No. 10-2015-0120400, filed in Republic of Korea on Aug. 26, 2015, all of which are hereby expressly incorporated by reference into the present application.

TECHNICAL FIELD

The present invention relates to a digital device, and more particularly, to a data processing in a digital device.

BACKGROUND ART

Mobile devices such as smartphones, tablet PCs and the like are making remarkable progress behind the standing devices such as PCs and TVs. Although the standing devices and the mobile devices has been separately developed in their own fields, distinctions between the fields of the standing and mobile devices are getting unclear owing to the recent digital convergence boom.

A digital TV employing a large-screen display has been conventionally used for the specific purpose only, whereas a digital TV employing a small-screen display has been popularly used at home. Thus, as a size of a display is small, when a user makes a request for additional information or launches a web browser except watching a broadcast program received from a broadcasting station on a channel through a digital TV, there is a problem that the user is unable to watch a currently viewed program. Such a problem may be solved through screen partition to some extent. Yet, when a display size is small, if a screen is partitioned, since it is difficult to recognize contents of the respective screens, inconvenience may be caused to a user.

Recently, owing to the development of display technology, a digital TV employing a large-screen display is popularly used at home. However, as the aforementioned inconvenience still exists despite increasing a display size, The demands for methods of enhancing user's use convenience by efficiently outputting numerous data from a digital device such as a large-screen display employed digital TV and the like are increasingly rising.

DISCLOSURE OF THE INVENTION

Technical Task

The present invention intends to resolve the above demands.

One technical task of the present invention is to provide a method of efficiently providing a multitude of data to a screen simultaneously in a digital device.

Another technical task of the present invention is to prevent viewer's immersion sense from being interrupted by appropriately distributing and assigning data to a screen as well as partitioning the screen to meet a situation in case of providing a multitude of data simultaneously.

Further technical task of the present invention is to promote user's product purchase desire through raised cost-effectiveness and improvement of user's satisfaction by increasing efficiency of a digital device employing a large-screen display.

Technical tasks obtainable from the present invention are non-limited by the above-mentioned technical task(s). And, other unmentioned technical tasks can be clearly understood from the following description by those having ordinary skill in the technical field to which the present invention pertains.

Technical Solutions

Disclosed in the present specification are various embodiments for a digital device and method of processing data therein.

In one technical aspect of the present invention, provided herein is a method of processing data in a digital device, including launching a first application, receiving a second application launch request, generating a first display window and a second display window for partitioned screens by partitioning a screen in response to the second application launch request, outputting a first application data and a second application data to the first display window and the second display window, respectively, receiving a third application launch request, outputting a launch-requested third application data to the second display window, receiving a fourth application launch request, if a launch-requested fourth application is an application related to the third application data, partitioning the screen and generating a third display window for a newly partitioned screen, and outputting a fourth application data to the third display window.

In another technical aspect of the present invention, provided herein is a method of processing data in a digital device, including receiving an N-screen partition request, generating N display windows for partitioned screens in response to the screen partition request, outputting a first application data to a first display window, receiving a menu launcher output request, outputting a requested menu launcher to a second display window, and outputting a second application data selected from the menu launcher or submenu items selected from the menu launcher to a third display window.

In another technical aspect of the present invention, provided herein is a digital device, including a user interface unit receiving first to fourth application launch requests, a decoder decoding a launch-requested application data, a controller configured to control a first application to be launched, control a first application data and a second application data to be outputted to a first display window and a second display window, respectively by partitioning a screen in response to the second application launch request and then generating the first display window and the second display window for partitioned screens, control a third application data to be outputted to the second display window currently outputting the second application data if the third application launch request is received, and control a fourth application data to be outputted to a third display window by partitioning the screen additionally if the fourth application launch request is received and a fourth application data is related to the third application data and then generating the third display window for the additionally partitioned screen, and an output unit outputting the first to third display windows and the application data to the respective display windows.

In further technical aspect of the present invention, provided herein is a digital device, including a user interface unit receiving an N-screen partition request and a menu launcher output request, a decoder decoding application data to be outputted to each partitioned screen, a controller configured to control a first application data to be outputted to a first display window by generating N display windows for partitioned screens in response to the screen partition request, control a requested menu launcher to be outputted to a second display window in response to the menu launcher output request, and control a second application data selected from the menu launcher or submenu items selected from the menu launcher to be outputted to a third display window, and an output unit outputting the first application data, the menu launcher and the second application data or the submenu items.

Technical task(s) obtainable from the present invention are non-limited by the above-mentioned technical task. And, other unmentioned technical tasks can be clearly understood from the following description by those having ordinary skill in the technical field to which the present invention pertains.

Advantageous Effects

The present invention provides the following features and/or effects.

According to one of various embodiments of the present invention, in case of providing a multitude of data simultaneously in a digital device, it is able to provide a method of efficiently providing a multitude of data to a screen simultaneously.

According to another one of various embodiments of the present invention, viewer's immersion sense can be prevented from being interrupted by appropriately distributing and assigning data to a screen as well as partitioning the screen to meet a situation in case of providing a multitude of data simultaneously.

According to another one of various embodiments of the present invention, user's product purchase desire can be promoted through raised cost-effectiveness and improvement of user's satisfaction by increasing efficiency of a digital device employing a large-screen display.

Effects obtainable from the present invention are non-limited by the above mentioned effect. And, other unmentioned effects can be clearly understood from the following description by those having ordinary skill in the technical field to which the present invention pertains.

DESCRIPTION OF DRAWINGS

FIGS. 19 to 29 are diagrams to describe a method of processing partition screen data in response to a situation in a digital device according to one embodiment of the present invention.

BEST MODE FOR INVENTION

Figure 1:
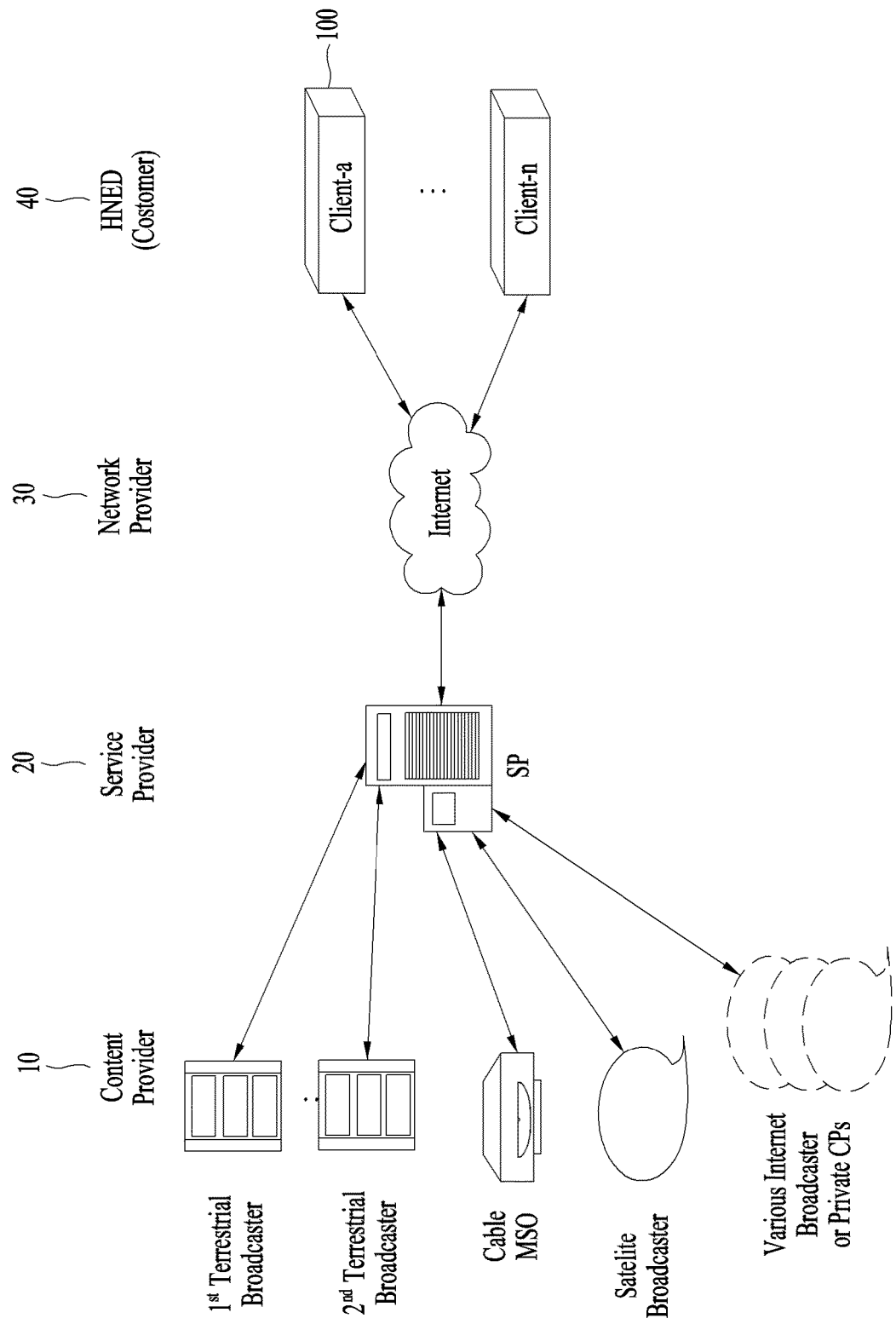
FIG. 1 is a schematic diagram illustrating a service system including a digital device according to one embodiment of the present invention.

Description will now be given in detail according to various embodiment(s) for a digital device and method of processing data therein disclosed herein, with reference to the accompanying drawings.

Suffixes such as "module", "unit" and the like in this disclosure may be used to refer to elements or components. Use of such a suffix herein is merely intended to facilitate description of the specification, and both suffixes may be interchangeably usable. The description with ordinal numbers such as 'first ~', 'second ~' and the like is provided to facilitate the description of the corresponding terminologies only, which is non-limited by such terminologies or ordinal numbers.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, the descriptions disclosed in the present specification and/or drawings correspond to one preferred embodiment of the present invention and are non-limited by the preferred embodiment. And, the scope/extent of the right should be determined through the appended claims.

'Digital device' described in the present specification includes any device capable of performing at least one of transmission/reception, processing and output of data for example. The data include all data related to content, service and application for example. The digital device can be connected with another digital device, an external server and the like through a wire/wireless network and transmit/receive the data. In doing so, if necessary, the data may be appropriately converted before the transmission/reception. The digital devices may include standing devices (e.g., Network TV, HBBTV (Hybrid Broadcast Broadband TV), Smart TV, IPTV (Internet Protocol TV), PC (Personal Computer), etc.) and mobile devices (or handheld devices) (e.g., PDA (Personal Digital Assistant), Smart Phone, Tablet PC, Notebook, etc.). In the present specification, to help the understanding of the present invention and the clarity of the applicant's description, a digital TV is shown as an embodiment of a digital device in FIG. 2 and a mobile device is shown as an embodiment of a digital device in FIG. 3. Besides, a digital device may include a panel-only configuration or a SET configuration such as a set-top box (STB).

In the above description, 'wire/wireless network' is a common name of a network supportive of connection/data transceiving between a client and a server. Such wire/wireless networks include all communication networks supported currently or all communication networks that will be supported in the future, by the specifications and are capable of supporting one or more communication protocols for the same. Such wire/wireless networks can be established by a network for a wire connection and a communication specification or protocol for the same (e.g., USB (Universal Serial Bus), CVBS (Composite Video Banking Sync), Component, S-video (analog), DVI (Digital Visual Interface), HDMI (High Definition Multimedia Interface), RGB, D-SUB, etc.) and a network for a wireless connection and a communication specification or protocol (e.g., Bluetooth, RFID (Radio Frequency Identification), IrDA (infrared Data Association), UWB (Ultra Wideband), ZigBee, DLNA (Digital Living Network Alliance), WLAN (Wireless LAN)(Wi-Fi), Wibro (Wireless broadband), Wimax (World Interoperability for Microwave Access), HSDPA (High Speed Downlink Packet Access), LTE/LTE-A (Long Term Evolution/LTE-Advanced), Wi-Fi direct).

Besides, if a device is simply named a digital device in this disclosure, the meaning may indicate a standing device or a mobile device according to a context, or can be used to indicate both unless mentioned specially.

Meanwhile, a digital device is an intelligent device supportive of a broadcast receiving function, a computer function or support, at least one external input and the like, and is able to support e-mail, web browsing, banking, game, application and the like through the aforementioned wire/wireless network. Moreover, the digital device may include an interface (e.g., manual input device, touchscreen, space remote controller, etc.) to support at least one input or control means (hereinafter 'control means').

Besides, a digital device may use a standardized OS (operating system). Particularly, a digital device described in the present specification uses webOS for one embodiment. Hence, a digital device can process adding, deleting, amending, updating and the like of various services or applications on Universal OS kernel or Linux kernel, through which a further user-friendly environment can be configured and provided.

Meanwhile, the aforementioned digital device can receive and process an external input. Herein, the external input includes an external input device, i.e., any input means or digital device capable of transmitting/receiving and processing data by being connected to the aforementioned digital device through wire/wireless network. For instance, as the external inputs, a game device (e.g., HDMI (High-Definition Multimedia Interface), Playstation, X-Box, etc.), a printing device (e.g., smart phone, tablet PC, pocket photo, etc.), and a digital device (e.g., smart TV, Blu-ray device, etc.) are included.

Besides, 'server' described in the present specification means a digital device or system that supplies data to the aforementioned digital device (i.e., client) or receives data from it, and may be called a processor. For example, the server may include a portal server providing web page, web content or web service, an advertising server providing advertising data, a content server providing contents, an SNS server providing SNS (Social Network Service), a service server provided by a manufacturer, an MVPD (Multichannel Video Programming Distributor) providing VoD (Video on Demand) or streaming service, a service server providing a pay service and the like.

Moreover, in case that the following description is made using an application only for clarity in the present specification, it may mean a service as well as an application on the basis of a corresponding context and the like. Meanwhile, an application may mean a web application according to a webOS platform.

The present invention shall be described in detail with reference to the accompanying drawings as follows.

FIG. 1 illustrates a broadcast system including a digital receiver according to an embodiment of the present invention.

Referring to FIG. 1, examples of a broadcast system comprising a digital receiver may include a content provider (CP) 10, a service provider (SP) 20, a network provider (NP) 30, and a home network end user (HNED) (Customer) 40. The FINED 40 includes a client 100, that is, a digital receiver.

Each of the CP 10, SP 20 and NP 30, or a combination thereof may be referred to as a server. The HNED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefor. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Figure 2:
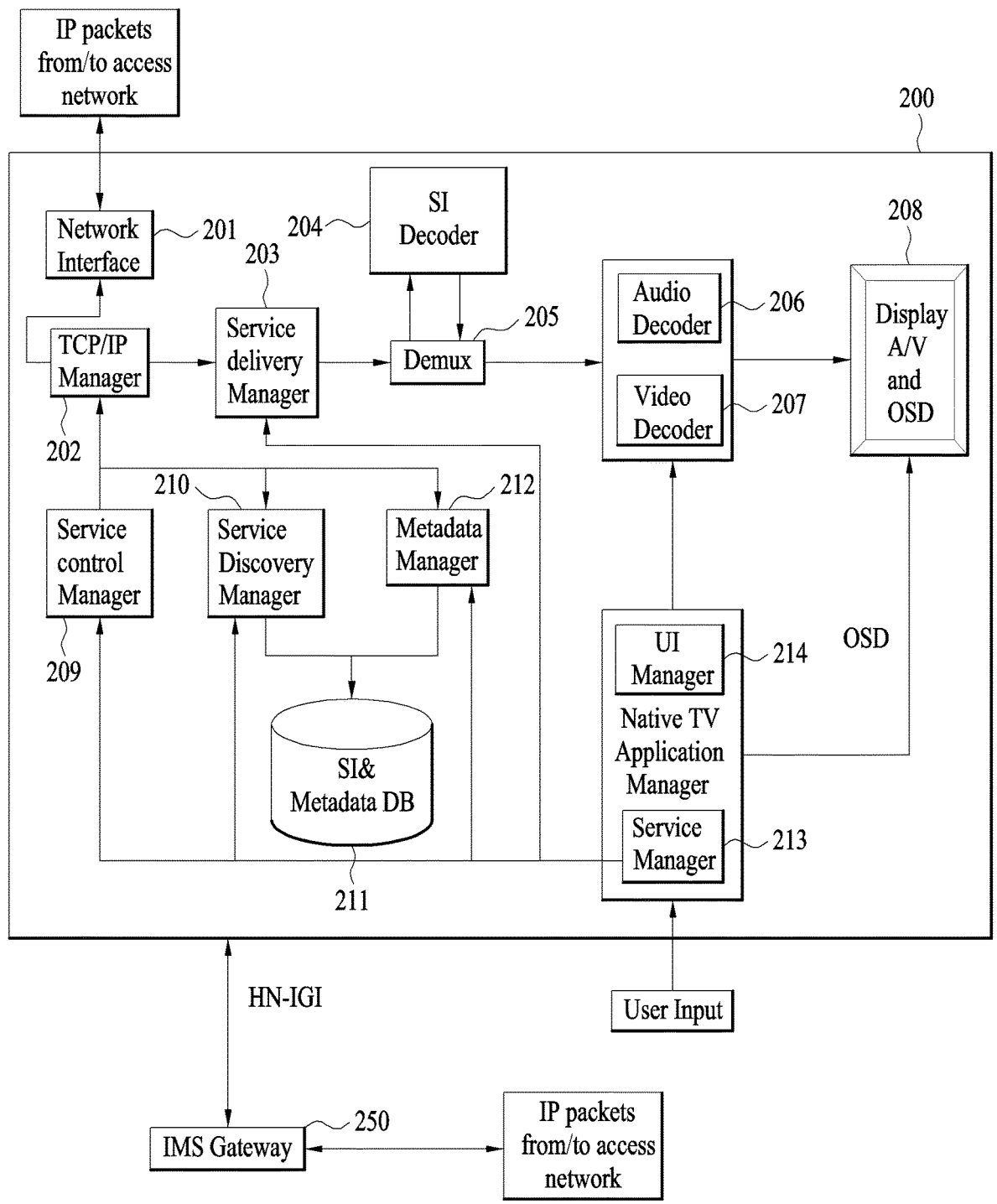
FIG. 2 is a block diagram showing a digital device according to one embodiment of the present invention.

FIG. 2 is a schematic diagram of a digital receiver 200 according to an embodiment of the present invention. The digital receiver 200 may correspond to the client 100 shown in FIG. 1.

The digital receiver 200 may include a network interface 201, a TCP/IP manager 202, a service delivery manager 203, an SI (System Information, Service Information or Signaling Information) decoder 204, a demultiplexer 205, an audio decoder 206, a video decoder 207, a display A/V and OSD (On Screen Display) module 208, a service control manager 209, a service discovery manager 210, a SI & metadata database (DB) 211, a metadata manager 212, an application manager, etc.

The network interface 201 may receive or transmit IP packets including service data through a network. In other words, the network interface 201 may receive IP packets including at least one of text data, image data, audio data, and video data, used for SNS, as well as services and applications from a server connected thereto through a network.

The TCP/IP manager 202 may involve delivery of IP packets transmitted to the digital receiver 200 and IP packets transmitted from the digital receiver 200, that is, packet delivery between a source and a destination. The TCP/IP manager 202 may classify received packets according to an appropriate protocol and output the classified packets to the service delivery manager 205, the service discovery manager 210, the service control manager 209, and the metadata manager 212.

The service delivery manager 203 may control classification and processing of service data. The service delivery manager 203 may control real-time streaming data, for example, using real-time protocol/real-time control protocol (RTP/RTCP). In other words, the service delivery manager 203 may parse a real-time streaming data packet, transmitted on the basis of the RTP, according to the RTP and transmits the parsed data packet to the demultiplexer 205 or store the parsed data packet in the SI & metadata DB 211 under the control of the service manager 213. The service delivery manager 203 can feed back network reception information to the server on the basis of the RTP.

The demultiplexer 205 may demultiplex audio data, video data, SI from a received packet through packet identifier (PID) filtering and transmit the demultiplexed data to corresponding processors, that is, the audio/video decoder 206/207 and the SI decoder 204.

The SI decoder 204 may parse and/or decode SI data such as program specific information (PSI), program and system information protocol (PSIP), digital video broadcast-service information (DVB-SI), etc.

The SI decoder 204 may store the parsed and/or decoded SI data in the SI & metadata DB 211. The SI data stored in the SI & metadata DB 211 can be read or extracted and used by a component which requires the SI data. EPG data can also be read from the SI & metadata DB 211. This will be described below in detail.

The audio decoder 206 and the video decoder 207 respectively may decode audio data and video data, which are demultiplexed by the demultiplexer 205. The decoded audio data and video data may be provided to the user through the display unit 208.

The application manager may include a service manager 213 and a user interface (UI) manager 214, administrate the overall state of the digital receiver 200, provides a UI, and manage other mangers.

The UI manager 214 can receive a key input from the user and provide a graphical user interface (GUI) related to a receiver operation corresponding to the key input through OSD.

The service manager 213 may control and manage service-related managers such as the service delivery manager 203, the service discovery manager 210, the service control manager 209, and the metadata manager 212.

The service manager 213 may configure a channel map and enable channel control at the request of the user on the basis of the channel map.

The service manager 213 may receive service information corresponding to channel from the SI decoder 204 and set audio/video PID of a selected channel to the demultiplexer 205 so as to control the demultiplexing procedure of the demultiplexer 205.

The application manager can configure an OSD image or control configuration of the OSD image to provide a window for SNS on a predetermined region of the screen when the user requests SNS. The application manager can configure the OSD image or control the configuration of OSD image such that the SNS window can be determined and provided at the request of the user in consideration of other services, for example, a broadcast service. In other words, when the digital receiver 200 may provide a service (for example, SNS) through an image on the screen, the digital receiver 200 may configure the image such that it can appropriately cope with requests in consideration of relationship with other services, priority, etc.

The application manager can receive data for SNS from a related external server such as an SNS providing server or a manufacturer-provided server and store the received data in a memory such that the data is used to configure OSD for providing SNS at the request of the user and SNS may be provided through a predetermined area of the screen. Furthermore, the digital receiver 200 can store data, related with a service and input by the user during the service, in the memory in a similar manner such that the data is used to configure the service and, if required, process the data into a form required for another digital receiver and transmit the processed data to the other digital receiver or a related service server.

In addition, the application manager, the controller or the digital receiver can control information or an action corresponding to a request of the user to be executed when the user makes the request while using the SNS. For example, when the user selects input data of another user or a region corresponding to the input data while using the SNS, the application manager, the controller or the digital receiver may control the first process and/or the second process for handling the selected data or region to be performed and control the first result and/or the second result to be output in an appropriate form. The first result and/or the second result can include information, an action, a related UI, etc. and be configured in various forms such as text, an image, audio/video data, etc. The first result and/or the second result can be manually or automatically provided and performed by the digital receiver.

When the user moves the first result (e.g. image data) to a broadcast program or broadcast service output area through drag & drop, the digital receiver can perform the second process (e.g., search process) on data relating to the first result using an electronic program guide (EPG) or electronic service guide (ESG) (referred to as 'broadcast guide' hereinafter) (i.e., a search engine) to provide a second result. Here, the second result can be provided in a form similar to the broadcast guide used as a search engine or provided as a separately configured UI. When the second result is provided in the form of the broadcast guide, other data can be provided with the second result. In this case, the second result can be configured such that it is distinguished from other data so as to allow the user to easily recognize the second data. To discriminate the second result from other data, the second result can be highlighted, hatched, and provided in 3-dimensional (3D) form.

In the execution of the second process, the digital receiver can automatically determine the type of the second process and whether or not to perform the second process on the basis of a position variation of the first result. In this case, coordinate information of the screen can be used for determining whether the position of the first result is changed or for information on a changed position between the second process and the first result. For example, when a service and/or OSD may be displayed on the screen, the digital receiver can determine and store coordinate information about the displayed service and/or OSD. Accordingly, the digital receiver can be aware of coordinate information about a service and data being provided to the screen in advance and thus can recognize a variation in the position (information) of the first result on the basis of the coordinate information and perform the second process based on the position of the first result.

The service discovery manager 210 may provide information required to select a service provider that provides a service. Upon receipt of a signal for selecting a channel from the service manager 213, the service discovery manager 210 discovers a service on the basis of the received signal.

The service control manager 209 may select and control a service. For example, the service control manager 209 may perform service selection and control using IGMP (Internet Group Management Protocol) or real time streaming protocol (RTSP) when the user selects a live broadcast service and using RTSP when the user selects a video on demand (VOD) service.

The schemes or protocols described in the specification are exemplified in order to aid in understanding of the present invention for convenience of explanations and the scope of the present invention is not limited thereto. Accordingly, the schemes or protocols can be determined in consideration of conditions different from the exemplified ones and other schemes or protocols can be used.

The metadata manager 212 may manage metadata regarding services and store metadata in the SI & metadata DB 211.

The SI & metadata DB 211 may store SI data decoded by the SI decoder 204, metadata managed by the metadata manager 212, and information required to select a service provider, which is provided by the service discovery manager 210. In addition, the SI & metadata DB 211 can store system set-up data.

An IMS (IP Multimedia Subsystem) gateway 250 may include functions required to access an IMS based IPTV services.

Figure 3:
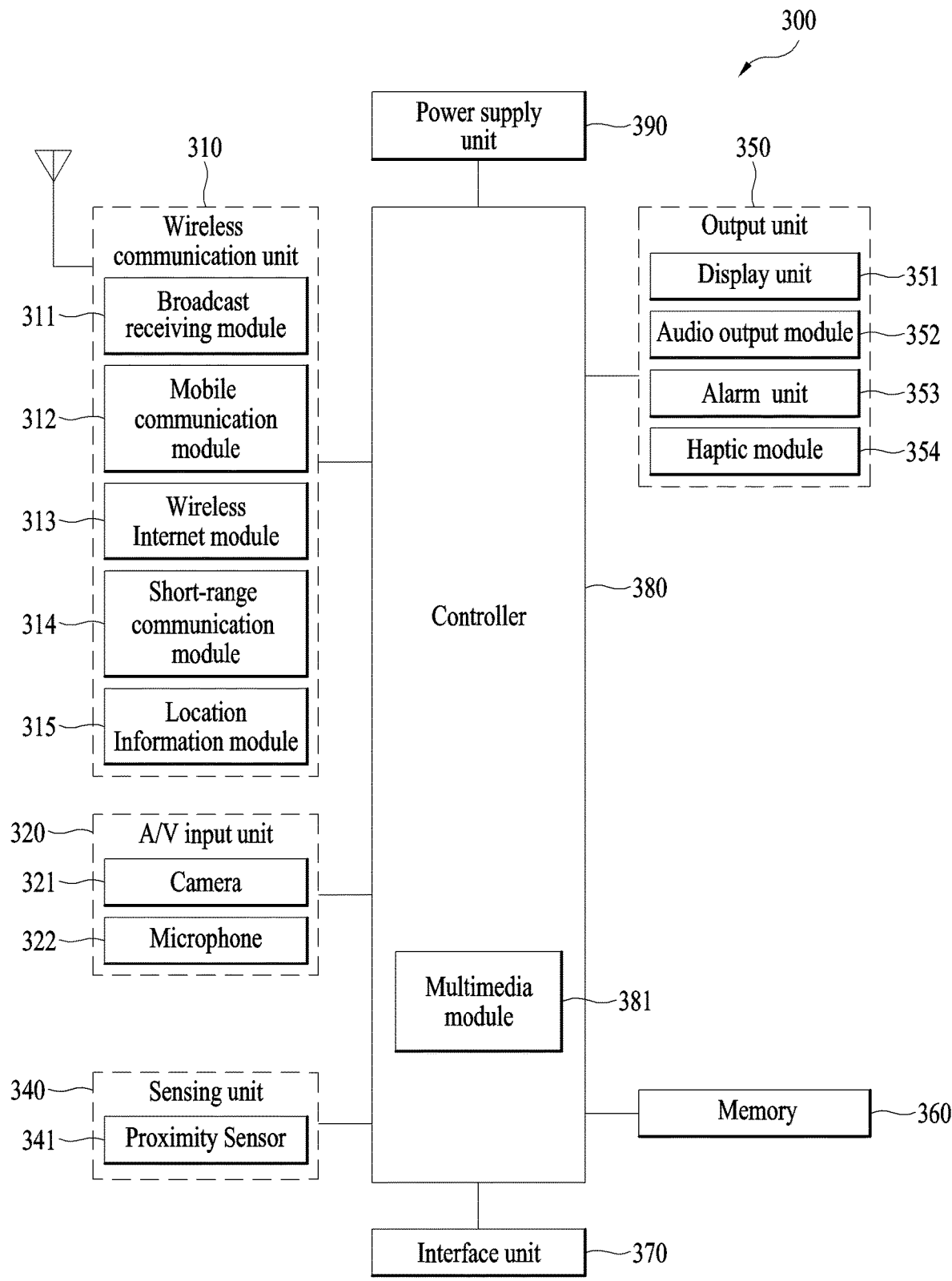
FIG. 3 is a block diagram showing the configuration of a digital device according to another embodiment of the present invention.

FIG. 3 is a block diagram of a mobile terminal 300 in accordance with an embodiment of the present invention. With reference to FIG. 3, the mobile terminal 300 includes a wireless communication unit 310, an A/V (audio/video) input unit 320, an user input unit 330, a sensing unit 340, an output unit 350, a memory 360, an interface unit 370, a controller 380, and a power supply unit 390. FIG. 3 shows the mobile terminal 300 having various components, but it is understood that implementing all of the illustrated components is not a requirement. More or fewer components may be implemented according to various embodiments.

The wireless communication unit 310 typically includes one or more components which permit wireless communication between the mobile terminal 300 and a wireless communication system or network within which the mobile terminal 300 is located. For instance, the wireless communication unit 310 can include a broadcast receiving module 311, a mobile communication module 312, a wireless Internet module 313, a short-range communication module 314, and a position-location module 315.

The broadcast receiving module 311 receives a broadcast signal and/or broadcast associated information from an external broadcast managing server via a broadcast channel. The broadcast channel may include a satellite channel and a terrestrial channel. At least two broadcast receiving modules 311 can be provided in the mobile terminal 300 to facilitate simultaneous reception of at least two broadcast channels or broadcast channel switching.

The broadcast managing server is generally a server which generates and transmits a broadcast signal and/or broadcast associated information or a server which is provided with a previously generated broadcast signal and/or broadcast associated information and then transmits the provided signal or information to a terminal. The broadcast signal may be implemented as a TV broadcast signal, a radio broadcast signal, and/or a data broadcast signal, among other signals. If desired, the broadcast signal may further include a broadcast signal combined with a TV or radio broadcast signal.

The broadcast associated information includes information associated with a broadcast channel, a broadcast program, or a broadcast service provider. Furthermore, the broadcast associated information can be provided via a mobile communication network. In this case, the broadcast associated information can be received by the mobile communication module 312.

The broadcast associated information can be implemented in various forms. For instance, broadcast associated information may include an electronic program guide (EPG) of digital multimedia broadcasting (DMB) and an electronic service guide (ESG) of digital video broadcast-handheld (DVB-H).

The broadcast receiving module 311 may be configured to receive broadcast signals transmitted from various types of broadcast systems. By non-limiting example, such broadcasting systems may include digital multimedia broadcasting-terrestrial (DMB-T), digital multimedia broadcasting-satellite (DMB-S), digital video broadcast-handheld (DVB-H), digital video broadcast-convergence of broadcasting and mobile services (DVB-CBMS), Open Mobile Alliance Broadcast (OMA-BCAST), the data broadcasting system known as media forward link only (MediaFLO™) and integrated services digital broadcast-terrestrial (ISDB-T). Optionally, the broadcast receiving module 311 can be configured to be suitable for other broadcasting systems as well as the above-noted digital broadcasting systems.

The broadcast signal and/or broadcast associated information received by the broadcast receiving module 311 may be stored in a suitable device, such as the memory 360.

The mobile communication module 312 transmits/receives wireless signals to/from one or more network entities (e.g., a base station, an external terminal, and/or a server) via a mobile network such as GSM (Global System for Mobile communications), CDMA (Code Division Multiple Access), or WCDMA (Wideband CDMA). Such wireless signals may carry audio, video, and data according to text/multimedia messages.

The wireless Internet module 313 supports Internet access for the mobile terminal 300. This module may be internally or externally coupled to the mobile terminal 300. The wireless Internet technology can include WLAN (Wireless LAN), Wi-Fi, Wibro™ (Wireless broadband), Wimax™ (World Interoperability for Microwave Access), HSDPA (High Speed Downlink Packet Access), GSM, CDMA, WCDMA, or LTE (Long Term Evolution).

Wireless Internet access by Wibro™, HSPDA, GSM, CDMA, WCDMA, or LTE is achieved via a mobile communication network. In this regard, the wireless Internet module 313 may be considered as being a kind of the mobile communication module 312 to perform the wireless Internet access via the mobile communication network.

The short-range communication module 314 facilitates relatively short-range communications. Suitable technologies for implementing this module include radio frequency identification (RFID), infrared data association (IrDA), ultra-wideband (UWB), as well as the networking technologies commonly referred to as Bluetooth™ and ZigBee™, to name a few.

The position-location module 315 identifies or otherwise obtains the location of the mobile terminal 100. According to one embodiment, this module may be implemented with a global positioning system (GPS) module. The GPS module 315 is able to precisely calculate current 3-dimensional position information based on at least longitude, latitude or altitude and direction (or orientation) by calculating distance information and precise time information from at least three satellites and then applying triangulation to the calculated information. Location information and time information are calculated using three satellites, and errors of the calculated location position and one or more time information are then amended (or corrected) using another satellite. In addition, the GPS module 315 is able to calculate speed information by continuously calculating a real-time current location.

With continued reference to FIG. 3, the audio/video (A/V) input unit 320 is configured to provide audio or video signal input to the mobile terminal 300. As shown, the A/V input unit 320 includes a camera 321 and a microphone 322. The camera 321 receives and processes image frames of still pictures or video, which are obtained by an image sensor in a video call mode or a photographing mode. Furthermore, the processed image frames can be displayed on the display 351.

The image frames processed by the camera 321 can be stored in the memory 360 or can be transmitted to an external recipient via the wireless communication unit 310. Optionally, at least two cameras 321 can be provided in the mobile terminal 300 according to the environment of usage.

The microphone 322 receives an external audio signal while the portable device is in a particular mode, such as phone call mode, recording mode and voice recognition. This audio signal is processed and converted into electronic audio data. The processed audio data is transformed into a format transmittable to a mobile communication base station via the mobile communication module 312 in a call mode. The microphone 322 typically includes assorted noise removing algorithms to remove noise generated in the course of receiving the external audio signal.

The user input unit 330 generates input data responsive to user manipulation of an associated input device or devices. Examples of such devices include a keypad, a dome switch, a touchpad (e.g., static pressure/capacitance), a jog wheel, and a jog switch.

The sensing unit 340 provides sensing signals for controlling operations of the mobile terminal 300 using status measurements of various aspects of the mobile terminal. For instance, the sensing unit 340 may detect an open/closed status of the mobile terminal 100, the relative positioning of components (e.g., a display and keypad) of the mobile terminal 300, a change of position (or location) of the mobile terminal 300 or a component of the mobile terminal 300, a presence or absence of user contact with the mobile terminal 300, and an orientation or acceleration/deceleration of the mobile terminal 300. As an example, a mobile terminal 300 configured as a slide-type mobile terminal is considered. In this configuration, the sensing unit 340 may sense whether a sliding portion of the mobile terminal is open or closed. According to other examples, the sensing unit 340 senses the presence or absence of power provided by the power supply unit 390, and the presence or absence of a coupling or other connection between the interface unit 370 and an external device. According to one embodiment, the sensing unit 340 can include a proximity sensor 341.

The output unit 350 generates output relevant to the senses of sight, hearing, and touch. Furthermore, the output unit 350 includes the display 351, an audio output module 352, an alarm unit 353, a haptic module 354, and a projector module 355.

The display 351 is typically implemented to visually display (output) information associated with the mobile terminal 300. For instance, if the mobile terminal is operating in a phone call mode, the display will generally provide a user interface (UI) or graphical user interface (GUI) which includes information associated with placing, conducting, and terminating a phone call. As another example, if the mobile terminal 300 is in a video call mode or a photographing mode, the display 351 may additionally or alternatively display images which are associated with these modes, the UI or the GUI.

The display module 351 may be implemented using known display technologies. These technologies include, for example, a liquid crystal display (LCD), a thin film transistor-liquid crystal display (TFT-LCD), an organic light-emitting diode display (OLED), a flexible display and a three-dimensional display. The mobile terminal 300 may include one or more of such displays.

Some of the displays can be implemented in a transparent or optical transmittive type, i.e., a transparent display. A representative example of the transparent display is the TOLED (transparent OLED). A rear configuration of the display 351 can be implemented as the optical transmittive type as well. In this configuration, a user may be able to see an object located at the rear of a terminal body on a portion of the display 351 of the terminal body.

At least two displays 351 can be provided in the mobile terminal 300 in accordance with one embodiment of the mobile terminal 300. For instance, a plurality of displays can be arranged to be spaced apart from each other or to form a single body on a single face of the mobile terminal 300. Alternatively, a plurality of displays can be arranged on different faces of the mobile terminal 300.

If the display 351 and a sensor for detecting a touch action (hereinafter called 'touch sensor') are configured as a mutual layer structure (hereinafter called 'touch screen'), the display 351 is usable as an input device as well as an output device. In this case, the touch sensor can be configured as a touch film, a touch sheet, or a touchpad.

The touch sensor can be configured to convert pressure applied to a specific portion of the display 351 or a variation of capacitance generated from a specific portion of the display 351 to an electronic input signal. Moreover, the touch sensor is configurable to detect pressure of a touch as well as a touched position or size.

If a touch input is made to the touch sensor, a signal(s) corresponding to the touch input is transferred to a touch controller. The touch controller processes the signal(s) and then transfers the processed signal(s) to the controller 380. Therefore, the controller 380 is made aware when a prescribed portion of the display 351 is touched.

Referring to FIG. 3, a proximity sensor 341 can be provided at an internal area of the mobile terminal 300 enclosed by the touch screen or around the touch screen. The proximity sensor is a sensor that detects a presence or non-presence of an object approaching a prescribed detecting surface or an object existing (or located) around the proximity sensor using an electromagnetic field strength or infrared ray without mechanical contact. Hence, the proximity sensor 341 is more durable than a contact type sensor and also has utility broader than the contact type sensor.

The proximity sensor 341 can include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, and an infrared proximity sensor. If the touch screen includes the electrostatic capacity proximity sensor, it is configured to detect the proximity of a pointer using a variation of an electric field according to the proximity of the pointer. In this configuration, the touch screen (touch sensor) can be considered as the proximity sensor.

For clarity and convenience of explanation, an action for enabling the pointer approaching the touch screen to be recognized as placed on the touch screen may be named 'proximity touch' and an action of enabling the pointer to actually come into contact with the touch screen may named 'contact touch'. And, a position, at which the proximity touch is made to the touch screen using the pointer, may mean a position of the pointer vertically corresponding to the touch screen when the pointer makes the proximity touch.

The proximity sensor detects a proximity touch and a proximity touch pattern (e.g., a proximity touch distance, a proximity touch duration, a proximity touch position, a proximity touch shift state). Information corresponding to the detected proximity touch action and the detected proximity touch pattern can be output to the touch screen.

The audio output module 352 functions in various modes including a call-receiving mode, a call-placing mode, a recording mode, a voice recognition mode, and a broadcast reception mode to output audio data which is received from the wireless communication unit 310 or is stored in the memory 360. During operation, the audio output module 352 outputs audio relating to a particular function (e.g., call received, message received). The audio output module 352 may be implemented using one or more speakers, buzzers, other audio producing devices, and combinations of these devices.

The alarm unit 353 outputs a signal for announcing the occurrence of a particular event associated with the mobile terminal 300. Typical events include a call received, a message received and a touch input received. The alarm unit 353 is able to output a signal for announcing the event occurrence by way of vibration as well as video or audio signal. The video or audio signal can be output via the display 351 or the audio output module 352. Hence, the display 351 or the audio output module 352 can be regarded as a part of the alarm unit 353.

The haptic module 354 generates various tactile effects that can be sensed by a user. Vibration is a representative one of the tactile effects generated by the haptic module 354. The strength and pattern of the vibration generated by the haptic module 354 are controllable. For instance, different vibrations can be output in a manner of being synthesized together or can be output in sequence.

The haptic module 354 is able to generate various tactile effects as well as the vibration. For instance, the haptic module 354 may generate an effect attributed to the arrangement of pins vertically moving against a contact skin surface, an effect attributed to the injection/suction power of air though an injection/suction hole, an effect attributed to the skim over a skin surface, an effect attributed to a contact with an electrode, an effect attributed to an electrostatic force, and an effect attributed to the representation of a hot/cold sense using an endothermic or exothermic device.

The haptic module 354 can be implemented to enable a user to sense the tactile effect through a muscle sense of a finger or an arm as well as to transfer the tactile effect through direct contact. Optionally, at least two haptic modules 354 can be provided in the mobile terminal 300 in accordance with an embodiment of the mobile terminal 300.

The memory 360 is generally used to store various types of data to support the processing, control, and storage requirements of the mobile terminal 300. Examples of such data include program instructions for applications operating on the mobile terminal 300, contact data, phonebook data, messages, audio, still pictures (or photo), and moving pictures. Furthermore, a recent use history or a cumulative use frequency of each data (e.g., use frequency for each phonebook, each message or each multimedia file) can be stored in the memory 360.

Moreover, data for various patterns of vibration and/or sound output in response to a touch input to the touch screen can be stored in the memory 360.

The memory 360 may be implemented using any type or combination of suitable volatile and non-volatile memory or storage devices including hard disk, random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, multimedia card micro type memory, card-type memory (e.g., SD memory or XD memory), or other similar memory or data storage device. Furthermore, the mobile terminal 300 is able to operate in association with a web storage for performing a storage function of the memory 360 on the Internet.

The interface unit 370 may be implemented to couple the mobile terminal 100 with external devices. The interface unit 370 receives data from the external devices or is supplied with power and then transfers the data or power to the respective elements of the mobile terminal 300 or enables data within the mobile terminal 300 to be transferred to the external devices. The interface unit 370 may be configured using a wired/wireless headset port, an external charger port, a wired/wireless data port, a memory card port, a port for coupling to a device having an identity module, audio input/output ports, video input/output ports, and/or an earphone port.

The identity module is a chip for storing various kinds of information for authenticating a usage authority of the mobile terminal 300 and can include a User Identify Module (UIM), a Subscriber Identity Module (SIM), and/or a Universal Subscriber Identity Module (USIM). A device having the identity module (hereinafter called 'identity device') can be manufactured as a smart card. Therefore, the identity device is connectible to the mobile terminal 300 via the corresponding port.

When the mobile terminal 300 is connected to an external cradle, the interface unit 370 becomes a passage for supplying the mobile terminal 300 with a power from the cradle or a passage for delivering various command signals input from the cradle by a user to the mobile terminal 300. Each of the various command signals input from the cradle or the power can operate as a signal enabling the mobile terminal 300 to recognize that it is correctly loaded in the cradle.

The controller 380 typically controls the overall operations of the mobile terminal 300. For example, the controller 380 performs the control and processing associated with voice calls, data communications, and video calls. The controller 380 may include a multimedia module 381 that provides multimedia playback. The multimedia module 381 may be configured as part of the controller 380, or implemented as a separate component.

Moreover, the controller 380 is able to perform a pattern (or image) recognizing process for recognizing a writing input and a picture drawing input carried out on the touch screen as characters or images, respectively.

The power supply unit 390 provides power required by various components of the mobile terminal 300. The power may be internal power, external power, or combinations of internal and external power.

Various embodiments described herein may be implemented in a computer-readable medium using, for example, computer software, hardware, or some combination of computer software and hardware. For a hardware implementation, the embodiments described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. Such embodiments may also be implemented by the controller 180.

For a software implementation, the embodiments described herein may be implemented with separate software modules, such as procedures and functions, each of which performs one or more of the functions and operations described herein. The software codes can be implemented with a software application written in any suitable programming language and may be stored in memory such as the memory 160, and executed by a controller or processor, such as the controller 380.

Figure 4:
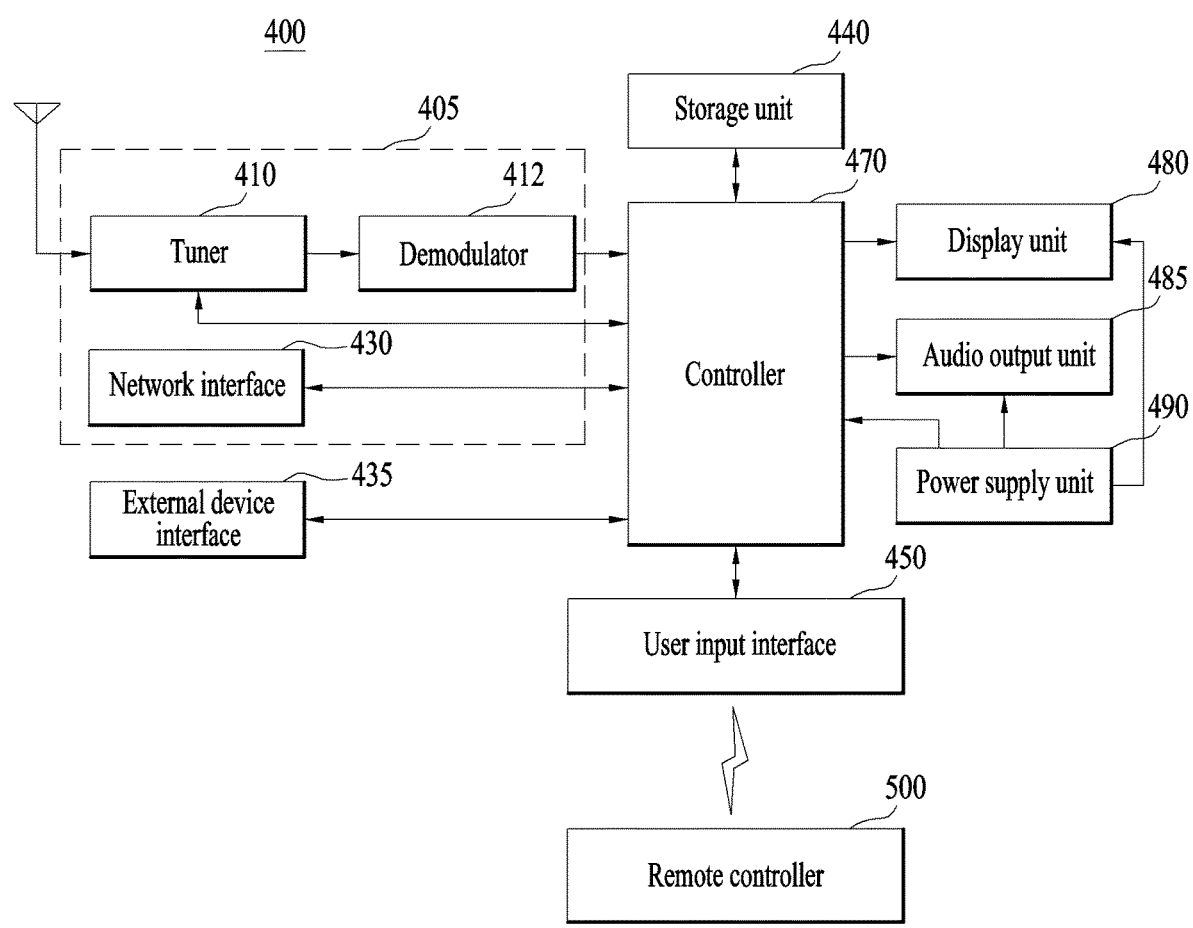
FIG. 4 is a diagram showing a digital device according to another embodiment of the present invention.

FIG. 4 illustrates a digital receiver according to another embodiment of the present invention.

Referring to FIG. 4, an exemplary digital receiver 400 according to the present invention may include a broadcast receiving unit 405, an external device interface 435, a storage unit 440, a user input interface 450, a controller 470, a display unit 480, an audio output unit 485, a power supply unit 490, and a photographing unit (not shown). The broadcast receiving unit 305 may include at least one of one or more tuner 410, a demodulator 420, and a network interface 430. The broadcast receiving unit 405 may include the tuner 410 and the demodulator 420 without the network interface 430, or may include the network interface 430 without the tuner 410 and the demodulator 420. The broadcast receiving unit 405 may include a multiplexer (not shown) to multiplex a signal, which is subjected to the tuner 410 and demodulated by the demodulator 420, and a signal received through the network interface 40. In addition, the broadcast receiving unit 405 can include a demultiplexer (not shown) and demultiplex a multiplexed signal, a demodulated signal, or a signal received through the network interface 430.

The tuner 410 may receive a radio frequency (RF) broadcast signal by tuning to a channel selected by the user from among RF broadcast signals received through an antenna or all previously stored channels.

The demodulator 420 may receive a digital IF (Intermediate Frequency) signal (DIF) converted by the tuner 410 and demodulate the DIF signal.

A stream signal output from the demodulator 420 may be input to the controller 470. The controller 470 can control demultiplexing, audio/video signal processing, etc. Furthermore, the controller 470 can control output of an image through the display unit 480 and output of audio through the audio output unit 485.

The external device interface 435 may provide an environment for interfacing external devices with the digital receiver 400. To implement this, the external device interface 435 may include an A/V input/output unit (not shown) or an RF communication unit (not shown).

The external device interface 435 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The digital receiver 400 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 430 may provide an interface for connecting the digital receiver 400 to wired/wireless networks.

Using the network interface 430, the digital receiver can transmit/receive data to/from other users or other electronic apparatuses or access a predetermined web page through a network connected thereto or another network linked to the connected network.

The network interface 430 can selectively receive a desired application from among publicly open applications through a network.

The storage unit 440 may store programs for signal processing and control and store a processed video, audio or data signal.

In addition, the storage unit 440 may execute a function of temporarily storing a video, audio or data signal input from the external device interface 435 or the network interface 430. The storage unit 440 may store information about a predetermined broadcast channel through a channel memory function.

The storage unit 440 can store an application or a list of applications input from the external device interface 435 or the network interface 430. The storage unit 440 may store various platforms which will be described later. The storage unit 440 can include storage media of one or more types, such as a flash memory type, a hard disk type, a multimedia card micro type, a card type memory (e.g. SD or XD memory), RAM, EEPROM, etc. The digital receiver 400 may reproduce content files (a video file, a still image file, a music file, a text file, an application file, etc.) and provide them to the user.

While FIG. 4 illustrates an embodiment in which the storage unit 440 is separated from the controller 470, the configuration of the digital receiver 400 is not limited thereto and the storage unit 440 may be included in the controller 470.

The user input interface 450 may transmit a signal input by the user to the controller 470 or deliver a signal output from the controller 470 to the user.

For example, the user input interface 450 can receive control signals such as a power on/off signal, a channel selection signal, an image setting signal, etc. from the remote controller 500 or transmit control signals of the controller 470 to the remote controller 500 according to various communication schemes such as RF communication, IR communication, and the like.

The user input interface 450 can transmit control signals input through a power key, a channel key, a volume key, and a local key (not shown) of a set value to the controller 470.

The user input interface 450 can transmit a control signal input from a sensing unit (not shown) which senses a gesture of the user or deliver a signal of the controller 470 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 470 can generate and output a signal for video or audio output by demultiplexing streams input through the tuner 410, the demodulator 420 or the external device interface 435 or processing demultiplexed signals.

A video signal processed by the controller 470 can be input to the display unit 380 and displayed as an image through the display unit 480. In addition, the video signal processed by the controller 470 can be input to an external output device through the external device interface 435.

An audio signal processed by the controller 470 can be applied to the audio output unit 485. Otherwise, the audio signal processed by the controller 470 can be applied to an external output device through the external device interface 435.

The controller 470 may include a demultiplexer and an image processor, which are not shown in FIG. 4.

The controller 470 can control the overall operation of the digital receiver 300. For example, the controller 470 can control the tuner 410 to tune to an RF broadcast corresponding to a channel selected by the user or a previously stored channel.

The controller 470 can control the digital receiver 400 according to a user command input through the user input interface 450 or an internal program. Particularly, the controller 470 can control the digital receiver 400 to be linked to a network to download an application or application list that the user desires to the digital receiver 400.

For example, the controller 470 may control the tuner 410 to receive a signal of a channel selected in response to a predetermined channel selection command received through the user input interface 450. In addition, the controller 470 may process a video, audio or data signal corresponding to the selected channel. The controller 470 may control information on a channel selected by the user to be output with a processed video or audio signal through the display unit 480 or the audio output unit 485.

Alternatively, the controller 470 may control a video signal or an audio signal received from an external apparatus, for example, a camera or a camcorder through the external device interface 435 to be output through the display unit 480 or the audio output unit 485 according to an external device image reproduction command received through the user input interface 450.

The controller 470 can control the display unit 480 to display images. For example, the controller 470 can control a broadcast image input through the tuner 410, an external input image received through the external device interface 435, an image input through the network interface 430, or an image stored in the storage unit 440 to be displayed on the display unit 480. Here, an image displayed on the display unit 480 can be a still image or video, and it can be a 2D or 3D image.

The controller 470 can control reproduction of content. Here, the content may be content stored in the digital receiver 400, received broadcast content, or content input from an external device. The content may include at least one of a broadcast image, an external input image, an audio file, a still image, an image of a linked web, and a text file.

The controller 470 can control display of applications or an application list, downloadable from the digital receiver 400 or an external network, when an application view menu is selected.

The controller 470 can control installation and execution of applications downloaded from an external network in addition to various user interfaces. Furthermore, the controller 470 can control an image relating to an application executed by user selection to be displayed on the display unit 480.

The digital receiver 400 may further include a channel browsing processor (not shown) which generates a thumbnail image corresponding to a channel signal or an external input signal.

The channel browsing processor can receive a stream signal (e.g., TS) output from the demodulator 420 or a stream signal output from the external device interface 435 and extract an image from the received stream signal to generate a thumbnail image. The generated thumbnail image can be directly input to the controller 470 or can be encoded and then input to the controller 470. Also, the thumbnail image can be coded into a stream and then applied to the controller 470. The controller 470 can display a thumbnail list including a plurality of thumbnail images on the display unit 480 using thumbnail images input thereto. The thumbnail images included in the thumbnail list can be updated sequentially or simultaneously. Accordingly, the user can conveniently check content of a plurality of broadcast channels.

The display unit 480 may convert a video signal, a data signal, and an OSD signal processed by the controller 470 and a video signal and a data signal received from the external device interface 435 into RGB signals to generate driving signals. The display unit 480 may be a PDP, an LCD, an OLED, a flexible display, a 3D display or the like. The display unit 480 may be configured as a touch-screen and used as an input device rather than an output device. The audio output unit 485 receives a signal audio-processed by the controller 470, for example, a stereo signal, a 3.1 channel signal or a 5.1 channel signal, and outputs the received signal as audio. The audio output unit 485 can be configured as one of various speakers.

The digital receiver 400 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 470 through the user input interface 450. The digital receiver 400 may further include the photographing unit (not shown) for photographing the user. Image information acquired by the photographing unit (not shown) can be supplied to the controller 470. The controller 470 may sense a gesture of the user from an image captured by the photographing unit (not shown) or a signal sensed by the sensing unit (not shown), or by combining the image and the signal.

The power supply unit 490 may supply power to the digital receiver 400. Particularly, the power supply unit 490 can supply power to the controller 470 which can be implemented as a system-on-chip (SoC), the display unit 480 for displaying images, and the audio output unit 485 for audio output.

The remote controller 500 may transmit user input to the user input interface 450. To achieve this, the remote controller 500 can use Bluetooth. RF communication, IR communication, UWB, ZigBee, etc. In addition, the remote controller 500 can receive audio, video or data signal output from the user input interface 350 and display the received signal or output the same as audio or vibration.

The functions of the application manager shown in FIG. 2 can be divided and executed by the controller 470, the storage unit 440, the user interface 450, the display unit 480 and the audio output unit 485 which are controlled by the controller 470.

The digital receivers shown in FIGS. 2 and 4 are exemplary and components thereof can be integrated, added or omitted according to specifications thereof. That is, two or more components can be integrated into one component or one component can be subdivided into two or more components as required. The function executed by each component is exemplified to describe embodiments of the present invention and detailed operations or devices do not limit the scope of the present invention. Some of the components shown in FIG. 2 may be omitted or a component (not shown in FIG. 2) may be added as required. The digital receiver according to the present invention may not include the tuner and the demodulator, differently from the digital receivers shown in FIGS. 2 and 4, and may receive content through the network interface or the external device interface and reproduce the content.

The digital receiver is an example of image signal processors which process an image stored therein or an input image. Other examples of the image signal processors may include a set-top box (STB) which does not include the display unit 380 and the audio output unit 485 shown in FIG. 4, a DVD player, a Blu-ray player, a game device, a computer, etc.

Figure 5:
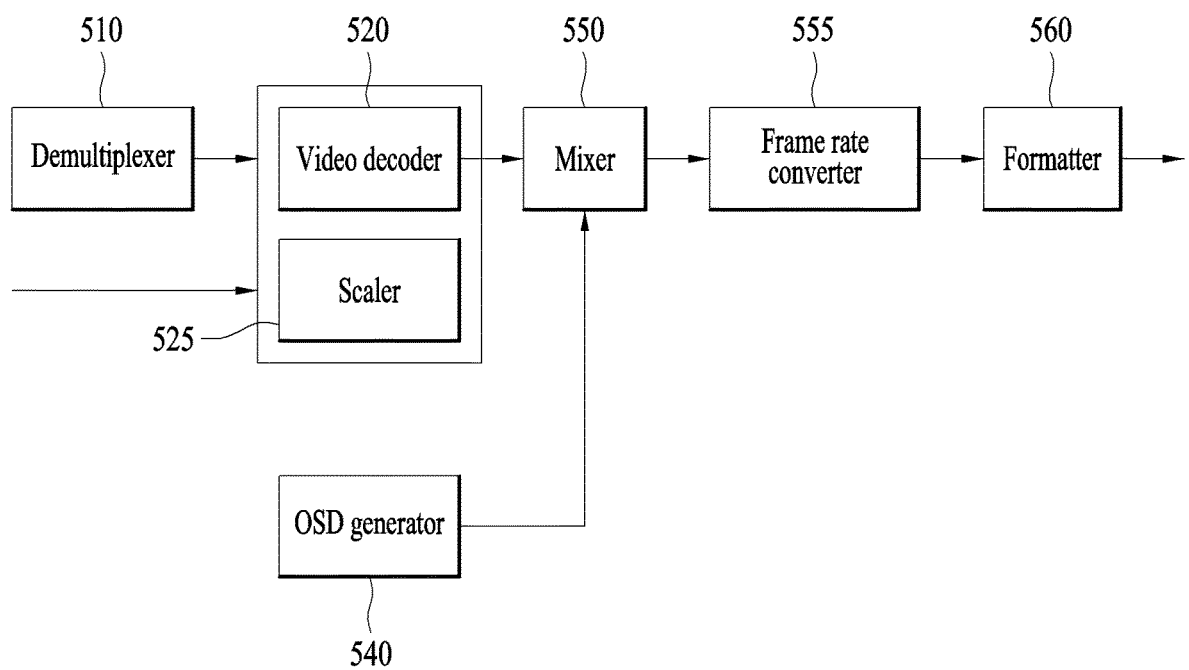
FIG. 5 is a block diagram showing the detailed configuration of each of controllers of FIGS. 2 to 4 according to one embodiment of the present invention.

FIG. 5 illustrates a digital receiver according to another embodiment of the present invention. Particularly, FIG. 5 shows a configuration for implementing a 3D digital receiver, which can be included in the configurations of FIGS. 2 and 3.

The digital receiver according to the present invention may include a demultiplexer 510, an image processor 520, an OSD generator 540, a mixer 550, a frame rate converter (FRC) 555, and a 3D formatter (or an Output formatter) 560.

The demultiplexer 510 can demultiplex an input stream signal into an MPEG-2 TS image, an audio signal and a data signal, for example.

The image processor can process a demultiplexed image signal using a video decoder 525 and a scaler 535. The video decoder 525 can decode the demultiplexed image signal and the scaler 535 can scale the resolution of the decoded image signal such that the image signal can be displayed.

The image signal decoded by the image processor 520 may be input to the mixer 550.

The OSD generator 540 may generate OSD data automatically or according to user input. For example, the OSD generator 540 may generate data to be displayed on the screen of an output unit in the form of an image or text on the basis of a control signal of a user input interface. OSD data generated by the OSD generator 540 may include various data such as a user interface image of the digital receiver, various menu screens, widget, icons, and information on ratings. The OSD generator 540 can generate a caption of a broadcast image or data for displaying EPG based broadcast information.

The mixer 550 may mix the OSD data generated by the OSD generator 540 and the image signal processed by the image processor 520. The mixer 550 may provide the mixed signal to the 3D formatter 560. By mixing the decoded image signal and the OSD data, OSD may be overlaid on a broadcast image or external input image.

The frame rate converter (FRC) 555 may convert a frame rate of input video. For example, the frame rate converter 555 can convert the frame rate of an input 60 Hz video to a frame rate of 120 Hz or 240 Hz, according to an output frequency of the output unit. The frame rate converter 555 may be bypassed when frame conversion is not executed.

The 3D formatter 560 may change the output of the frame rate converter 555, which is input thereto, into a form suitable for the output format of the output unit. For example, the 3D formatter 560 can output an RGB data signal. In this case, this RGB data signal can be output according to low voltage differential signaling (LVDS) or mini-LVDS. When a 3D image signal output from the frame rate converter 555 is input to the 3D formatter 560, the 3D formatter 560 can format the 3D image signal such that the 3D image signal is matched to the output format of the output unit, to thereby support a 3D service.

An audio processor (not shown) may audio-process a demultiplexed audio signal. The audio processor (not shown) can support various audio formats. For example, when audio signals are encoded in MPEG-2, MPEG-4, advanced audio coding (AAC), high efficiency-AAC (HE-AAC), AC-3 and bit sliced audio coding (BSAC) formats, the audio processor (not shown) can include decoders corresponding to the formats to process the audio signals. Furthermore, the audio processor (not shown) can control base, treble and volume.

In addition, a data processor (not shown) can process a demultiplexed data signal. For example, when a demultiplexed data signal is encoded, the data processor (not shown) can decode the encoded demultiplexed data signal. Here, the encoded data signal may be EPG information including broadcast information such as the start time and end time (or duration) of a broadcast program which is broadcast through each channel.

Figure 6:
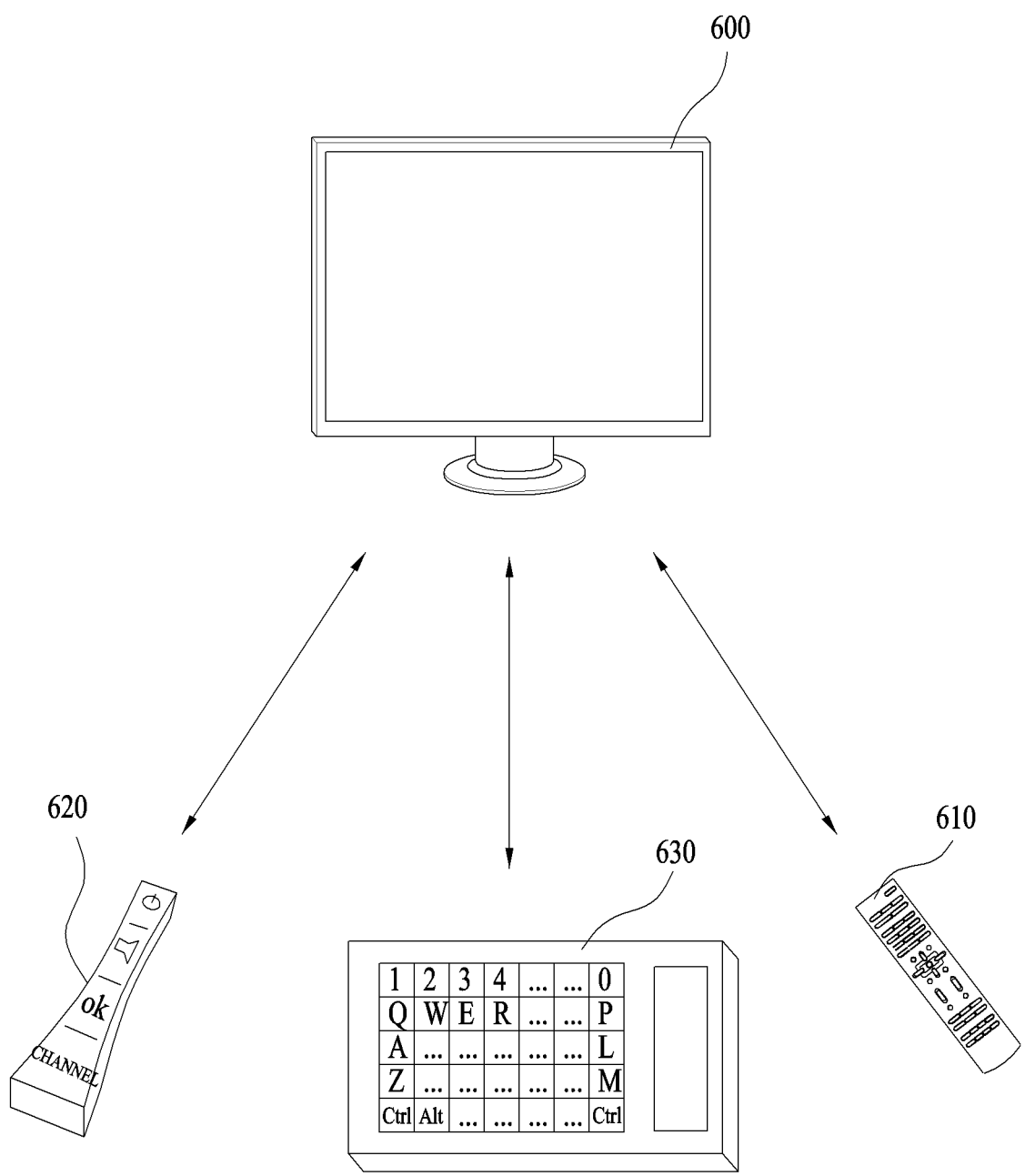
FIG. 6 is a diagram showing an input unit connected to each of the digital devices of FIGS. 2 to 4 according to one embodiment of the present invention.

FIG. 6 illustrates remote controllers of a digital receiver according to an embodiment of the present invention.

To execute various operations for implementing the present invention according to embodiments, various user interface devices (UIDs) which can communicate with a digital receiver 600 in a wired/wireless manner can be used as remote controllers.

The remote controllers can use various communication protocols such as Bluetooth, RFID, IrDA, UWB, ZigBee, DLNA, etc.

UIDs can include a mobile device (e.g., a smart phone, a tablet PC, and the like), a magic remote controller 620 and a remote controller 630 equipped with a keyboard and a touch pad in addition to a general remote controller 610.

The magic remote controller 620 may include a gyro sensor mounted therein to sense vibration of a user's hand or rotation. That is, the magic remote controller 620 can move a pointer according to up, down, left and right motions of the user such that the user can easily execute a desired action, for example, easily control a channel or a menu.

The remote controller 630 including the keyboard and touch pad can facilitate text input through the keyboard and control of movement of a pointer and magnification and reduction of a picture or video through the touch pad.

The digital device described in the present specification can be operated by based on WebOS platform. Hereinafter, a WebOS based process or algorithm may be performed by the controller of the above-described digital device. The controller includes the controllers of FIGS. 2 to 5 and has wide concepts. Accordingly, hereinafter, a component for processing WebOS based services, applications, content, etc., including software, firmware or hardware in a digital device is referred to a controller.

Such a WebOS based platform may improve development independency and functional extensibility by integrating services, applications, etc. based on a Luna-service bus, for example, and increase application development productivity based on web application framework. In addition, system resources, etc. may be efficiently used via a WebOS process and resource management to support multitasking.

A WebOS platform described in the present specification may be available or loaded not only for stationary devices such as personal computers (PCs). TVs and set top boxes (STBs) but also for mobile devices such as cellular phones, smartphones tablet PCs, laptops, and wearable devices.

A software structure for a digital device is a monolithic structure which solves conventional problems depending on markets, is a single process and closed product based on multi-threading, and has difficulties in terms of external applications. In pursuit of new platform based development, cost innovation via chipset replacement and UI application and external application development efficiency, layering and componentization are performed to obtain a 3-layered structure and an add-on structure for an add-on, a single source product and an open application. Recently, modular design of a software structure has been conducted in order to provide a web open application programming interface (API) for an echo system and modular architecture of a functional unit or a native open API for a game engine, and thus a multi-process structure based on a service structure has been produced.

Figure 7:
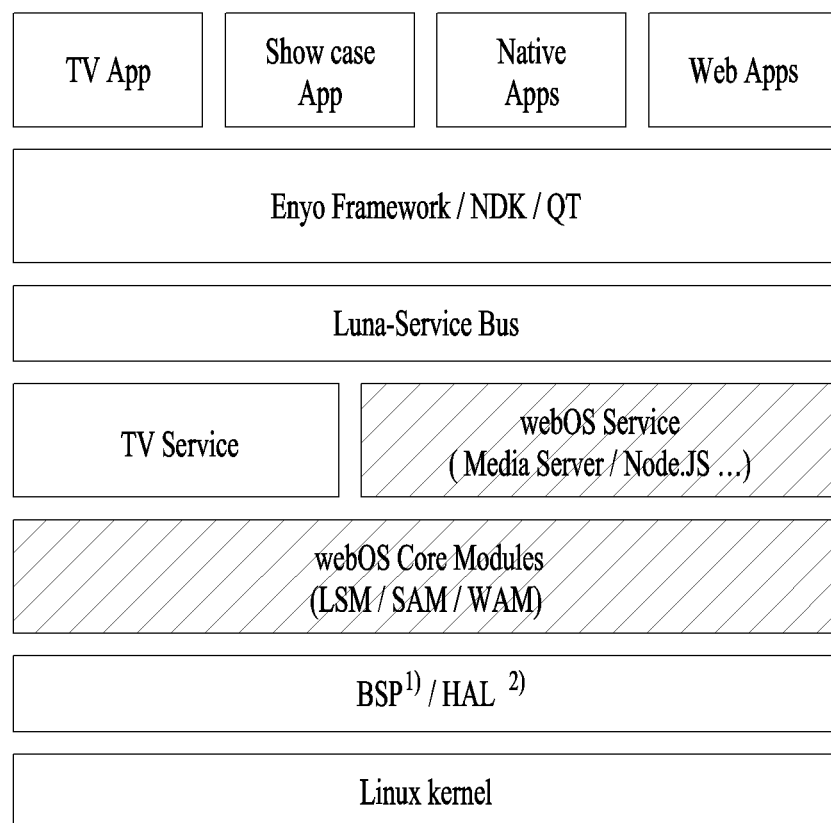
FIG. 7 is a diagram illustrating WebOS architecture according to one embodiment of the present invention.

FIG. 7 is a diagram illustrating WebOS architecture according to one embodiment of the present invention.

The architecture of a WebOS platform will now be described with reference to FIG. 7.

The platform may be largely divided into a kernel, a webOS core platform based on a system library, an application, a service, etc.

The architecture of the WebOS platform has a layered structure. OS is provided at a lowest layer, system library(s) are provided at a next highest layer and applications are provided at the highest layer.

First, the lowest layer is an OS layer including a Linux kernel such that Linux is included as an OS of the digital device.

At layers higher than the OS layer, a board support package (BSP)/hardware abstraction layer (HAL) layer, a WebOS core modules layer, a service layer, a Luna-service bus layer and an Enyo framework/native developer's kit (NDK)/QT layer are sequentially provided. At the highest layer, an application layer is provided.

One or more layers of the above-described WebOS layered structure may be omitted and a plurality of layers may be combined to one layer and one layer may be divided into a plurality of layers.

The WebOS core module layer may include a Luna surface manager (LSM) for managing a surface window, etc., a system & application manager (SAM) for managing execution and performance status of applications, etc., and a web application manager (WAM) for managing web applications based on WebKit.

The LSM manages an application window displayed on a screen. The LSM may control display hardware (HW) and provide a buffer for rendering content necessary for applications, and compose and output results of rendering a plurality of applications on a screen.

The SAM manages policy according to several conditions of systems and applications.

The WAM is based on Enyo framework, because a WebOS regards a web application as a basic application.

An application may use a service via a Luna-service bus. A service may be newly registered via a bus and the application may detect and use a desired service.

The service layer may include services having various service levels, such as a TV service, a WebOS service, etc. The WebOS service may include a media server, Node.JS, etc. and, in particular, the Node.JS service supports JavaScript, for example.

The WebOS service may be communicated to a Linux process implementing function logic via a bus. This WebOS service is largely divided into four parts, migrates from a TV process and an existing TV to a WebOS, is developed as services which differ between manufacturers, WebOS common services and Javascripts, and is composed of the Node.JS service used via Node.JS.

The application layer may include all applications supportable by a digital device, such as a TV application, a showcase application, a native application, a web application, etc.

Applications on the WebOS may be divided into a web application, a palm development kit (PDK) application, a Qt Meta Language or Qt Modeling Language (QML) application, etc. according to implementation methods.

The web application is based on a WebKit engine and is performed on WAM runtime. Such a web application is based on Enyo framework or may be developed and performed based on general HTML5, cascading style sheets (CSS) and JavaScripts.

The PDK application includes a native application developed with C/C++ based on a PDK provided for a third party or an external developer. The PDK refers to a set of development libraries and tools provided to enable a third party to develop a native application (C/C++) such as games. For example, the PDK application may be used to develop applications requiring high performance.

The QML application is a native application based on Qt and includes basic applications provided along with the WebOS platform, such as card view, home dashboard, virtual keyboard, etc. QML is a markup language of a script format, not C++.

The native application is an application which is developed and compiled using C/C++ and is executed in the binary form and has an advantage such as high execution speed.

Figure 8:
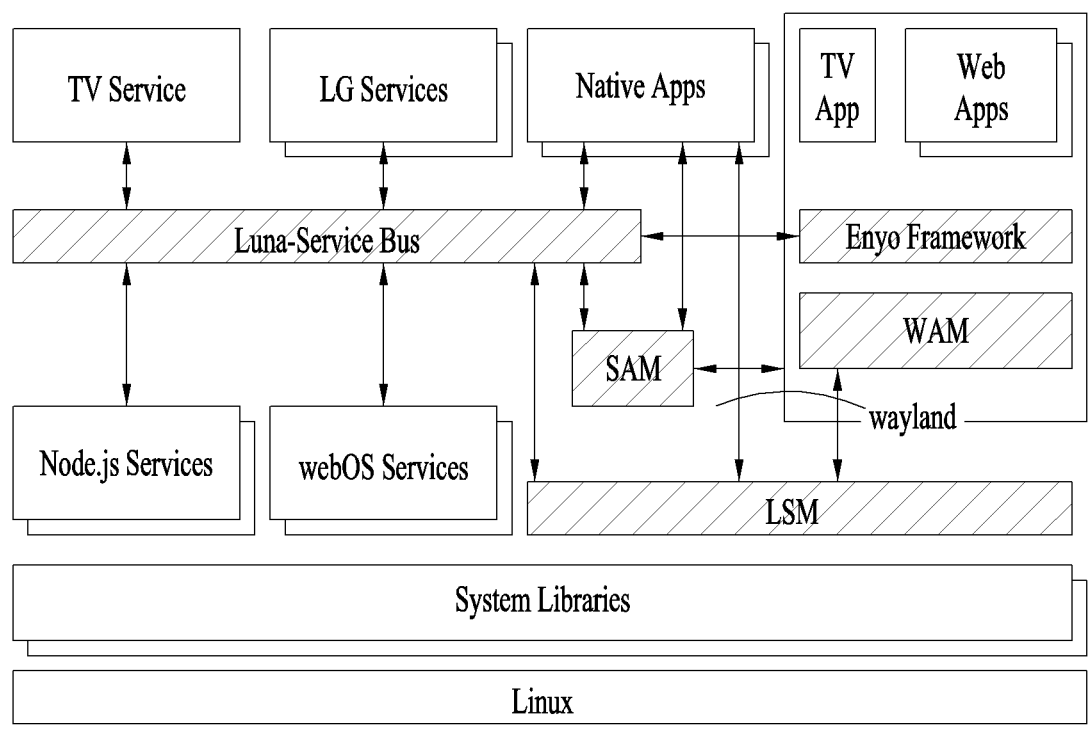
FIG. 8 is a diagram illustrating architecture of a WebOS device according to one embodiment of the present invention.

FIG. 8 is a diagram illustrating the architecture of a WebOS device according to one embodiment of the present invention.

FIG. 8 is a block diagram based on a runtime of a WebOS device and is described with reference to the layered structure of FIG. 7.

Hereinafter, a description will be given with reference to FIGS. 7 and 8.

Referring to FIG. 8, services, applications and WebOS core modules are included on a system OS (Linux) and system libraries and communication therebetween may be performed via a Luna-service bus.

Node.JS services based on HTML5 such as e-mail, contact or calendar, CSS, Javascript, etc., WebOS services such as logging, backup, file notify, database (DB), activity manager, system policy, audio daemon (AudioD), update, media server, etc., TV services such as electronic program guide (EPG), personal video recorder (PVR), data broadcasting, etc., CP services such as voice recognition, Now on, notification, search, auto content recognition (ACR), contents list browser (CBOX), wfdd, digital media remastering (DMR), remote application, download, Sony Philips digital interface format (SDPIF), etc., native applications such as PDK applications, browsers, QML applications, a UI-related TV applications based on Enyo framework and web applications are processed via WebOS core modules such as the above-described SAM, WAM and LSM via the Luna-service bus. The TV applications and the web applications are not necessarily based on Enyo framework or related to UI.

The CBOX may manage metadata and lists of content of external devices such as USB drivers, DLNA devices or Cloud servers connected to a TV. The CBOX may output content listing of various content containers such as USB, data management system (DMS), DVR, Cloud server, etc. as an integrated view. The CBOX may display various types of content listings such as pictures, music or video and manage metadata thereof. The CBOX may output content of an attached storage in real time. For example, if a storage device such as a USB is plugged in, the CBOX should immediately output a content list of the storage device. At this time, a standardized method for processing the content listing may be defined. The CBOX may accommodate various connection protocols.

The SAM is used to improve module complexity and extensibility. For example, an existing system manager processes several functions such as system UI, window management, web application runtime and UX constraint processing via one process and thus has high implementation complexity. In order to solve such a problem, the SAM divides main functions and clarifies an interface between functions, thereby decreasing implementation complexity.

The LSM is supported to independently develop and integrate a system UX such as card view, launcher, etc. and to easily cope with change in product requirements. The LSM maximally uses hardware resources to enable multitasking if a plurality of application screens is composed using an app-on-app method and may provide a window management mechanism for 21:9 and a multi-window.

The LSM supports implementation of a system UI based on a QML and improves development productivity. QML UX may easily configure a view using a screen layout and UI components based on model view controller (MVC) and easily develop code for processing user input. An interface between the QML and the WebOS component is achieved via a QML extensibility plug-in and graphic operation of an application may be based on Wayland protocol, luna-service call, etc.

The LSM is an abbreviation for a Luna surface manager and functions as an application window compositor.

The LSM composes and outputs independently developed applications, UI components, etc. on a screen. When components such as recent applications, showcase applications or launcher applications render respective content, the LSM defines an output area, a linkage method, etc. as a compositor. The LSM functioning as a compositor performs processing such as graphic composition, focus management, input events, etc. At this time, the LSM receives event, focus, etc. from an input manager, and a remote controller, a HID such as a mouse and keyboard, a joystick, a game pad, a remote application, a pen touch, etc. may be included as an input manager.

The LSM supports multiple window models and may be simultaneously executed in all applications as a system UI. The LSM may support launcher, recents, setting, notification, system keyboard, volume UI, search, finger gesture, voice recognition (speech to text (STT), text to speech (TTS), natural language processing (NLP), etc.), pattern gesture (camera or mobile radio control unit (MRCU)), live menu, ACR, etc.

Figure 9:
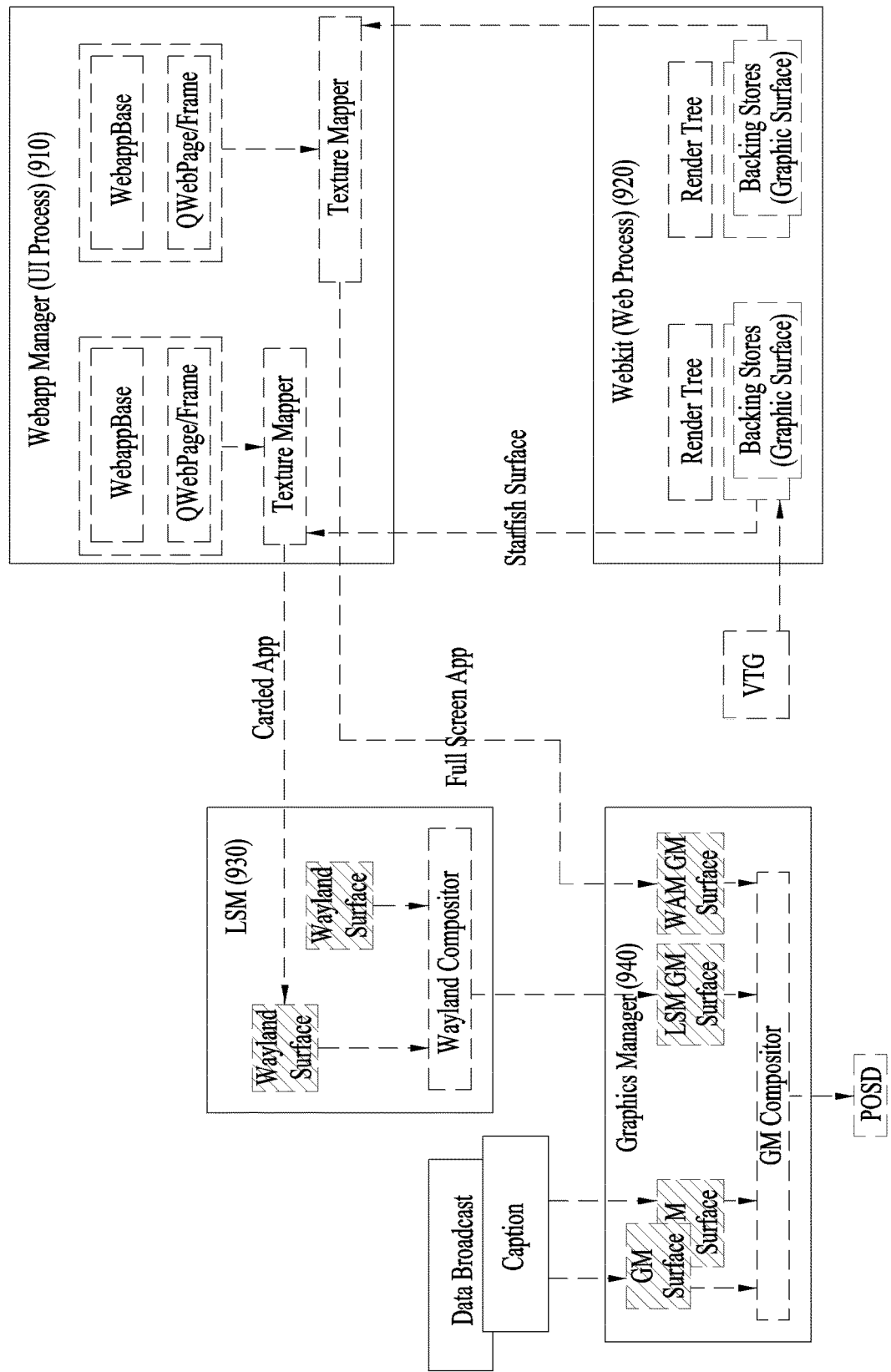
FIG. 9 is a diagram illustrating a graphic composition flow in a WebOS device according to one embodiment of the present invention.

FIG. 9 is a diagram illustrating a graphic composition flow in a WebOS device according to one embodiment of the present invention.

Referring to FIG. 9, graphic composition processing may be performed via a web application manager 910 functioning as a UI process, a WebKit 920 functioning as a web process, an LSM 930 and a graphics manager (GM) 940.

When the web application manager 910 generates web application based graphics data (or application) as a UI process, the generated graphics data is delivered to the LSM if the graphics data is not a fullscreen application. The web application manager 910 receives an application generated by the WebKit 920 in order to share a graphic processing unit (GPU) memory for graphic management between the UI process and the web process and delivers the application to the LSM 930 if the application is not a fullscreen application. If the application is a fullscreen application, the LSM 930 may bypass the application. In this case, the application is directly delivered to the graphics manager 940.

The LSM 930 transmits the received UI application to a Wayland compositor via a Wayland surface and the Wayland compositor appropriately processes the UI application and delivers the processed UI application to the graphics manager. The graphics data received from the LSM 930 is delivered to the graphics manager compositor via the LSM GM surface of the graphics manager 940, for example.

The fullscreen application is directly delivered to the graphics manager 940 without passing through the LSM 930 as described above and is processed in the graphics manager compositor via the WAM GM surface.

The graphics manager processes and outputs all graphics data in the webOS device and receives and outputs data passing through the above-described LSM GM surface, data passing through a WAM GM surface, and graphics data passing through a GM surface, such as a data broadcasting application or a caption application, on a screen. The function of the GM compositor is equal or similar to the above-described compositor.

Figure 10:
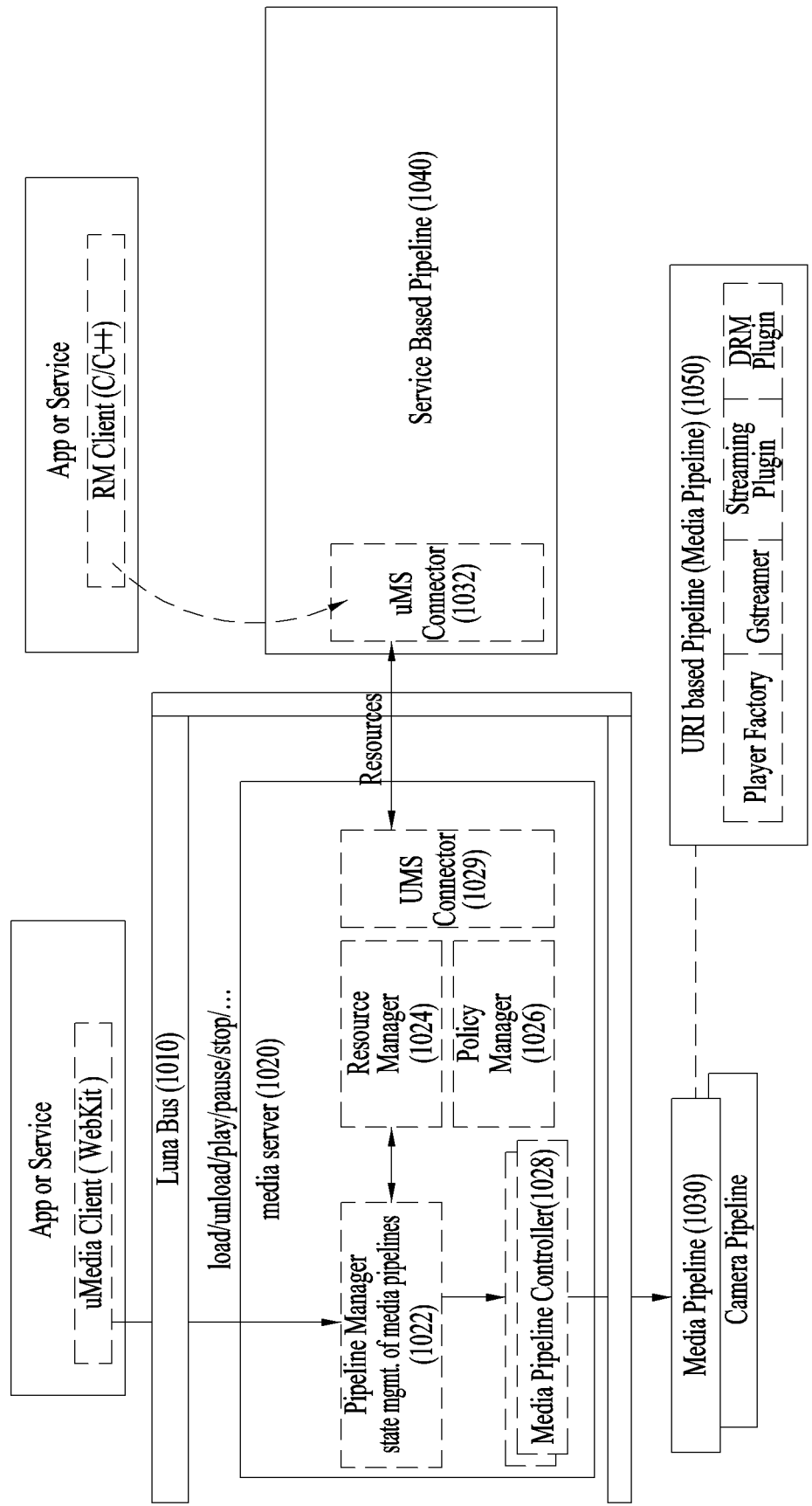
FIG. 10 is a diagram illustrating a media server according to one embodiment of the present invention.
Figure 11:
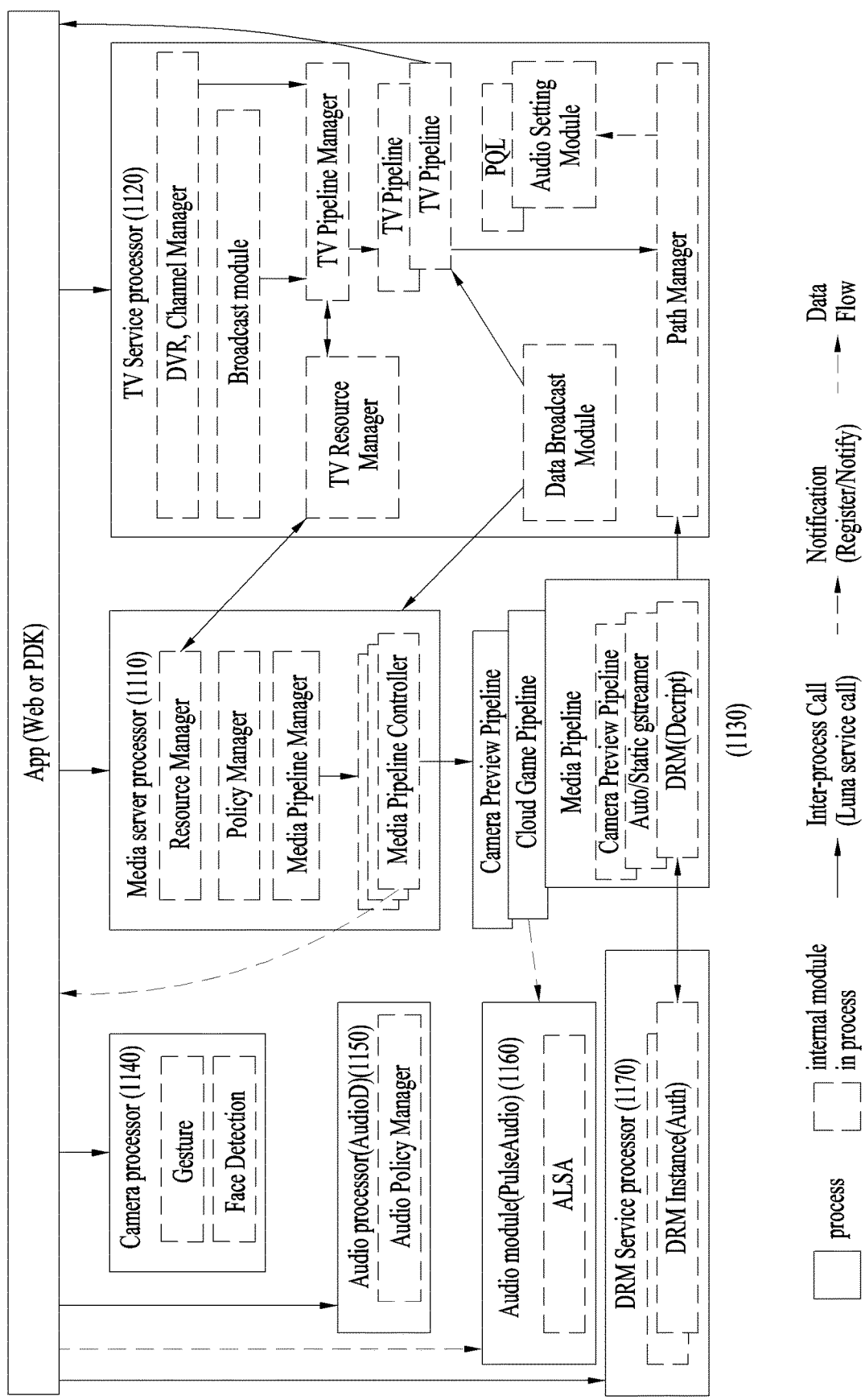
FIG. 11 is a block diagram showing the configuration of a media server according to one embodiment of the present invention.
Figure 12:
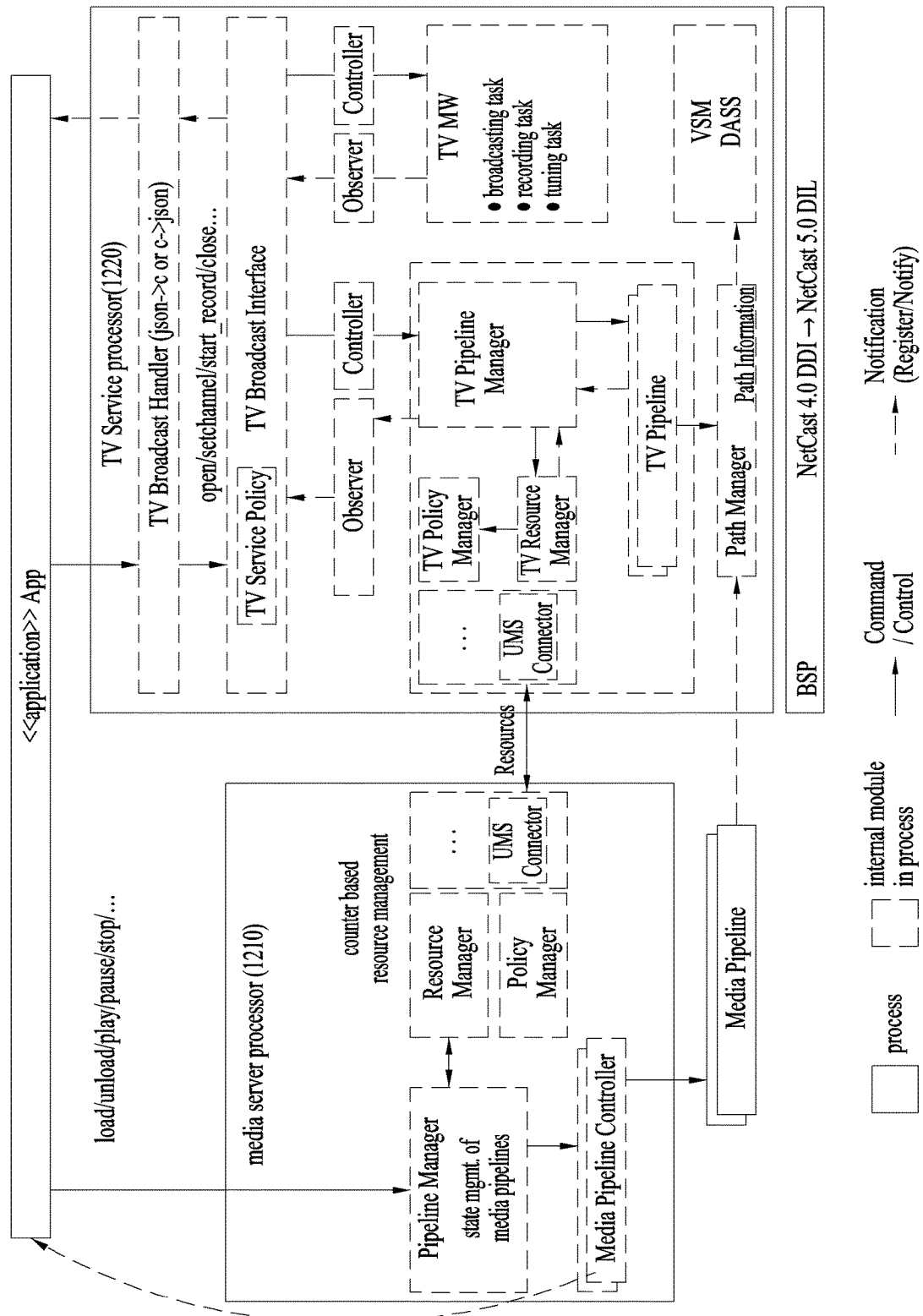
FIG. 12 is a diagram illustrating a relationship between a media server and a TV service according to one embodiment of the present invention.

FIG. 10 is a diagram illustrating a media server according to one embodiment of the present invention, FIG. 11 is a block diagram of a media server according to one embodiment of the present invention, and FIG. 12 is a diagram illustrating a relationship between a media server and a TV service according to one embodiment of the present invention.

The media server supports execution of a variety of multimedia in a digital device and manages necessary resources. The media server may efficiently use hardware resources necessary for media play. For example, the media server requires audio/video hardware resources for multimedia execution and efficiently manages a resource use status to efficiently use resources. In general, a stationary device having a screen larger than that of a mobile device requires more hardware resources upon multimedia execution and requires high encoding/decoding rate and graphics data transfer rate due to a large amount of data. The media server should perform not only streaming or file playback but also broadcasting, recording and tuning tasks, a task for simultaneously viewing and recording, and a task for simultaneous displaying a sender and a recipient on a screen upon video call. It is difficult for the media server to simultaneously perform several tasks due to restriction in hardware resources such as an encoder, a decoder, a tuner, a display engine, etc. in chipset units. For example, the media server restricts a use scenario or performs processing using user input.

The media server may make system stability robust, and may remove a playback pipeline, in which errors occur during media playback, per pipeline, such that other media play is not influenced even when errors occur. Such a pipeline is a chain for connecting unit functions such as decoding, analysis, output, etc. upon a media playback request, and required unit functions may be changed according to media type, etc.

The media server may have extensibility and may add a new type of pipeline without influencing an existing implementation method. For example, the media server may accommodate a camera pipeline, a video conference (Skype) pipeline, a third-party pipeline, etc.

The media server may process general media playback and TV task execution as separate services because the interface of the TV service is different from that of media playback. The media server supports operation such as "setchannel", "channelup", "channeldown", "channeltuning" and "recordstart" in relation to the TV service and support operation such as "play", "pause" and "stop" in relation to general media playback, that is, supports different operations with respect to the TV service and general media playback and processes the TV service and media playback as separate services.

The media server may control or manage a resource management function. Hardware resource assignment or recovery in a device is conducted by the media server. In particular, the TV service process delivers a task which is being executed and a resource assignment status to the media server. The media server secures resources to execute a pipeline whenever media is executed, allows media execution due to priority (e.g., policy) upon media execution request, and performs resource recovery of another pipeline, based on a resource status of each pipeline. The predefined execution priority and resource information necessary for a specific request are managed by a policy manager and the resource manager communicates with the policy manager to process resource assignment and recovery.

The media server may have identifiers (IDs) for all operations related to playback. For example, the media server may send a command to a specific pipeline based on the ID. The media server may send respective commands to pipelines for playback of two or more media.

The media server is responsible for playing back a HTML5 standard media.

The media server performs a service process of a TV pipeline according to a TV restructuralization range. The media server may be designed and implemented regardless of the TV restructuralization range. If the separate service process of the TV is not performed, the TV may be wholly re-executed when errors occurs in a specific task.

The media server is also referred to as uMS, that is, a micro media server. The media player is a media client and means WebKit for HTML5 video tag, camera, TV, Skype or second screen, for example.

The media server mainly manages micro resources such as a resource manager or a policy manager. The media server also controls playback of web standard media content. The media server may manage pipeline controller resources.

The media server supports extensibility, reliability, efficient resource usage, etc., for example.

In other words, the uMS, that is, the micro media server, manages and controls resource usage for appropriate processing within the WebOS device, such as resources such as cloud game, MVPD (pay service, etc.), camera preview, second screen or Skype, and TV resources. A pipeline is used upon usage of each resource, for example, and the media server may manage and control generation, deletion, use of a pipeline for resource management.

The pipeline may be generated when a media related to a task starts a sequence of request, decoding streaming and parsing such as video output. For example, in association with a TV service and an application, watching, recording, channel tuning, etc. are controlled and performed via pipelines individually generated according to requests thereof with respect to resource usage.

Referring to FIG. 10, a processing structure of a media server will be described in detail.

In FIG. 10, an application or service is connected to a media server 1020 via a Luna-service bus 1010 and the media server 1020 is connected to and managed by pipelines generated via the Luna-service bus 1010.

The application or service includes various clients according to properties thereof and may exchange data with the media server 1020 or the pipeline via the clients.

The clients include a uMedia client (WebKit) for connection with the media server 1020 and a resource manager (RM) client (C/C++), for example.

The application including the uMedia client is connected to the media server 1020 as described above. More specifically, the uMedia client corresponds to the below-described video object, for example, and uses the media server 1020, for video operation by a request, etc.

The video operation relates to a video status and may include all status data related to the video operation, such as loading, unloading, play (playback or reproduction), pause, stop, etc. Such video operations or statuses may be processed by generating individual pipelines. Accordingly, the uMedia client transmits status data related to the video operation to the pipeline manager 1022 in the media server.

The media server 1022 acquires information about resources of the current device via data communication with the resource manager 1024 and requests assignment of resources corresponding to the status data of the uMedia client. At this time, the pipeline manager 1022 or the resource manager 1024 controls resource assignment via data communication with the policy manager 1026 if necessary. For example, if resources to be assigned according to the request of the pipeline manager 1022 are not present or are lacking in the resource manager 1024, resource assignment may be appropriately performed according to priority comparison of the policy manager 1026.

The pipeline manager 1022 requests to generate a pipeline for operation according to the request of the uMedia client from the media pipeline controller 102, with respect to resources assigned according to resource assignment of the resource manager 1024.

The media pipeline controller 1028 generates a necessary pipeline under control of the pipeline manager 1022. As shown, a media pipeline, a camera pipeline, a pipeline related to playback, pause or stop may be generated. The pipeline includes pipelines for HTML5, web CP, Smartshare playback, thumbnail extraction. NDK, cinema, multimedia and hypermedia information coding experts group (MHEG), etc.

The pipeline may include a service-based pipeline and a URI based pipeline (media pipeline), for example.

Referring to FIG. 10, the application or service including the URI client may not be directly connected to the media server 1020, because the application or service can directly process a media. In other words, if the application or service directly processes a media, the media server may not be used. At this time, for pipeline generation and usage, resource management is necessary and, at this time, a uMS connector is used. When a resource management request for direct media processing of the application or service is received, the uMS connector communicates with the media server 1020 including the resource manager 1024. The media server 1020 also includes a uMS connector.

Accordingly, the application or service may cope with the request of the RM client via resource management of the resource manager 1024 via the uMS connector. The RM client may process services such as native CP, TV service, second screen, flash player, You Tube media source extensions (MSE), cloud game, Skype, etc. In this case, as described above, the resource manager 1024 may manage resources via appropriate data communication with the policy manager 1026 if necessary for resource management.

The URI based pipeline does not directly process the media unlike the above-RM client but processes the media via the media server 1020. The URI based pipeline may include player factory, Gstreamer, streaming plug-in, digital rights management (DRM) plug-in pipelines.

An interface method between the application and the media services is as follows.

An interface method using a service in a web application may be used. In this method, a Luna call method using a palm service bridge (PSB) and a method of using Cordova may be used, in which a display is extended to a video tag. In addition, a method of using HTML5 standard related to a video tag or media element may be used.

A method of using a service in PDK may be used.

Alternatively, a method of using in existing CP may be used. For backward compatibility, plug-in of an existing platform may be extended and used based on Luna.

Lastly, an interface method using a non-WebOS may be used. In this case, a Luna bus may be directly called to perform interfacing.

Seamless change is processed by a separate module (e.g., TVwin) and refers to a process of first displaying a TV program on a screen without a WebOS before or duration WebOS booting and then performing seamless processing. This is used for the purpose of first providing a basic function of a TV service, for fast response to a power-on request of a user, because a booting time of a WebOS is late. The module is a part of a TV service process and supports seamless change for providing fast booting and a basic TV function, factory mode, etc. The module is responsible for switching from the non-WebOS mode to the WebOS mode.

FIG. 11 shows the processing structure of the media server.

In FIG. 11, a solid box denotes a process component and a dotted box denotes an internal processing module of the process. A solid arrow denotes an inter-process call, that is, a Luna-service call and a dotted arrow denotes notification such as register/notify or data flow.

The service, the web application or the PDK application (hereinafter, referred to as "application") is connected to various service processing components via a Luna-service bus and is operated or controlled via the service processing components.

A data processing path is changed according to application type. For example, if the application includes image data related to a camera sensor, the image data is transmitted to and processed by a camera processor 1130. At this time, the camera processor 1130 includes a gesture or face detection module and processes image data of the received application. The camera processor 1130 may generate a pipeline via a media server processor 1110 with respect to data which requires use of a pipeline according to user selection or automatically and process the data.

Alternatively, if the application includes audio data, the audio may be processed via an audio processor (AudioD) 1140 and an audio module (PulseAudio) 1150. For example, the audio processor 1140 processes the audio data received from the application and transmits the processed audio data to the audio module 1150. At this time, the audio processor 1140 may include an audio policy manager to determine processing of the audio data. The processed audio data is processed by the audio module 1150. The application or a pipeline related thereto may notify the audio module 1150 of data related to audio data processing. The audio module 1150 includes advanced Linux sound architecture (ALSA).

Alternatively, if the application includes or processes (hereinafter, referred to as "includes") content subjected to DRM, the content data is transmitted to a DRM service processor 1160 and the DRM service processor 1160 generates a DRM instance and processes the content data subjected to DRM. The DRM service processor 1160 is connected to a DRM pipeline in a media pipeline via a Luna-service bus, for processing of the content data subjected to DRM.

Hereinafter, processing of an application including media data or TV service data (e.g., broadcast data) will be described.

FIG. 12 shows the media server processor and the TV service processor of FIG. 11 in detail.

Accordingly, a description will be given with reference to FIGS. 11 and 12.

First, if the application includes TV service data, the application is processed by the TV service processor 1120/1220.

The TV service processor 1120 includes at least one of a DVR/channel manager, a broadcast module, a TV pipeline manager, a TV resource manager, a data broadcast module, an audio setting module, a path manager, etc., for example. In FIG. 12, the TV service processor 1220 may include a TV broadcast handler, a TV broadcast interface, a service processor, TV middleware (MW), a path manager and a BSP (NetCast). The service processor may mean a module including a TV pipeline manager, a TV resource manager, a TV policy manager, a USM connector, etc., for example.

In the present specification, the TV service processor may have the configuration of FIG. 11 or FIG. 12 or a combination thereof. Some components may be omitted or other components (not shown) may be added.

The TV service processor 1120/1220 transmits DVR or channel related data to a DVR/channel manager and transmits the DVR or channel related data to the TV pipeline manager to generate and process a TV pipeline, based on attribute or type of the TV service data received from the application. If the attribute or type of the TV service data is broadcast content data, the TV service processor 1120 generates and processes a TV pipeline via the TV pipeline manager, for processing of the data via a broadcast module.

Alternatively, a JavaScript standard object notation (json) file or a file written in c is processed by the TV broadcast handler and transmitted to the TV pipeline manager via a TV broadcast interface to generate and process a TV pipeline. In this case, the TV broadcast interface may transmit the data or file passing through the TV broadcast handler to the TV pipeline manager based on TV service policy and refer to the data or file upon generating a pipeline.

The TV pipeline manager generates one or more pipelines according to a request for generation of a TV pipeline from the processing module or manager of the TV service processor, under control of the TV resource manager. The TV resource manager may be controlled by the TV policy manager, in order to request a resource assignment status for a TV service according to a request for generation of a TV pipeline of the TV pipeline manager, and may perform data communication with the media server processor 1110/1210 via a uMS connector. The resource manager in the media server processor 1110/1210 sends the resource assignment status for the TV service according to the request of the TV resource manager. For example, if the resource manager in the media server processor 1110/1210 determines that the resources for the TV service are already assigned, the TV resource manager may be notified that assignment of all resources is completed. At this time, the resource manager in the media server processor may remove a predetermined TV pipeline according to a predetermined criterion or priority of TV pipelines already assigned for the TV service along with notification and request generation of a TV pipeline for the requested TV service. Alternatively, the TV resource manager may appropriately remove a TV pipeline or may add or newly establish a TV pipeline according to a status report of the resource manager in the media server processor 1110/1210.

The BSP supports backward compatibility with an existing digital device.

The generated TV pipelines may appropriately operate under control of the path manager in the processing procedure. The path manager may determine or control the processing path or procedure of the pipelines in consideration of the TV pipeline in the processing procedure and the operation of the pipelines generated by the media server processor 1110/1210.

Next, if the application includes media data, not TV service data, the application is processed by the media server processor 1110/1210. The media server processor 1110/1210 includes a resource manager, a policy manager, a media pipeline manager, a media pipeline controller, etc. As pipelines generated under control of the media pipeline manager and the media pipeline controller, a camera preview pipeline, a cloud game pipeline, a media pipeline, etc. may be generated. The media pipeline may include streaming protocol, auto/static gstreamer, DRM, etc. and the processing flow thereof may be determined under control of the path manager. For a detailed description of the processing procedure of the media server processor 1110/1210, refer to the description of FIG. 10 and a repeated description will be omitted. In the present specification, the resource manager in the media server processor 1110/1210 may perform resource management to a counter base, for example.

Various embodiment(s) for a method of processing data in a digital device according to the present invention shall be described in detail with reference to the accompanying drawings as follows.

In the present invention, particularly, in case that a multitude of data should be simultaneously provided in a digital device, described are various embodiments of distributing and assigning data within a screen appropriately as well as partitioning the screen adaptively according to a situation in order to provide the data efficiently.

In the present specification, to help the understanding of the present invention and the clarity of the description, a digital TV is taken as an example. Particularly, the following description is made on the assumption that the digital TV employs a large-screen display. This is just one embodiment of the present invention only, by which the scope of the right of the present invention is non-limited.

Figure 13:
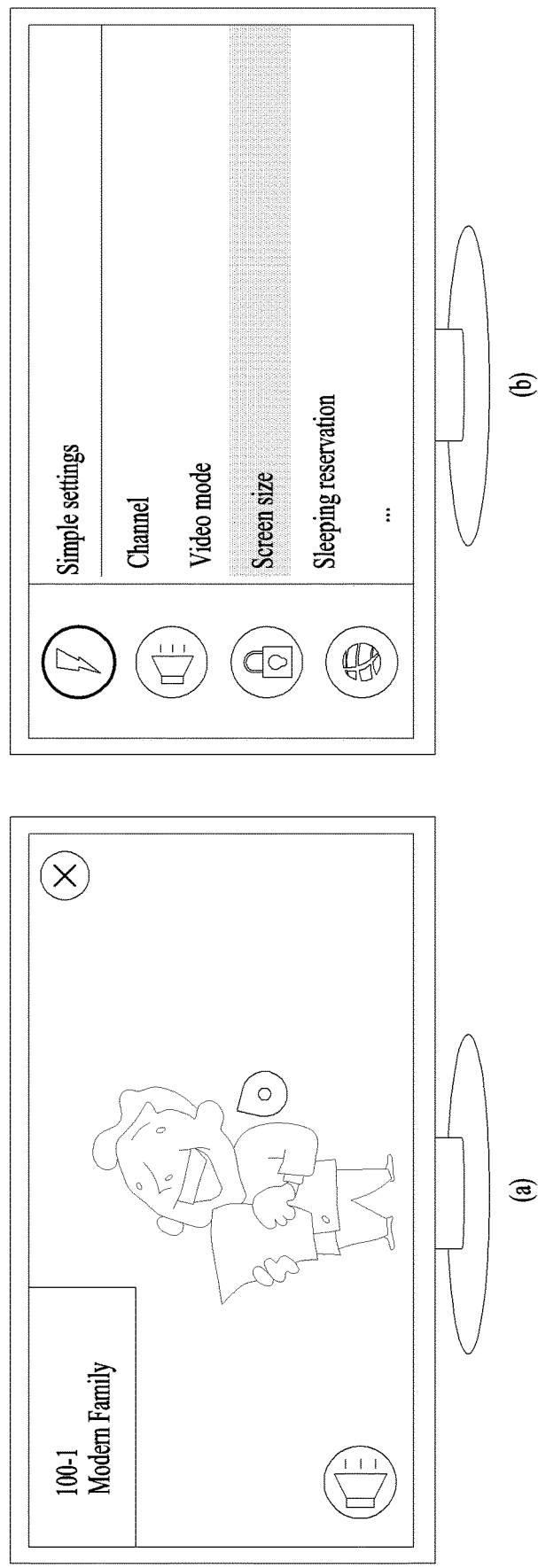
FIG. 13 and FIG. 14 are diagrams to describe a process for outputting additional information in the course of running an application in a digital device in association with the present invention.
Figure 14:
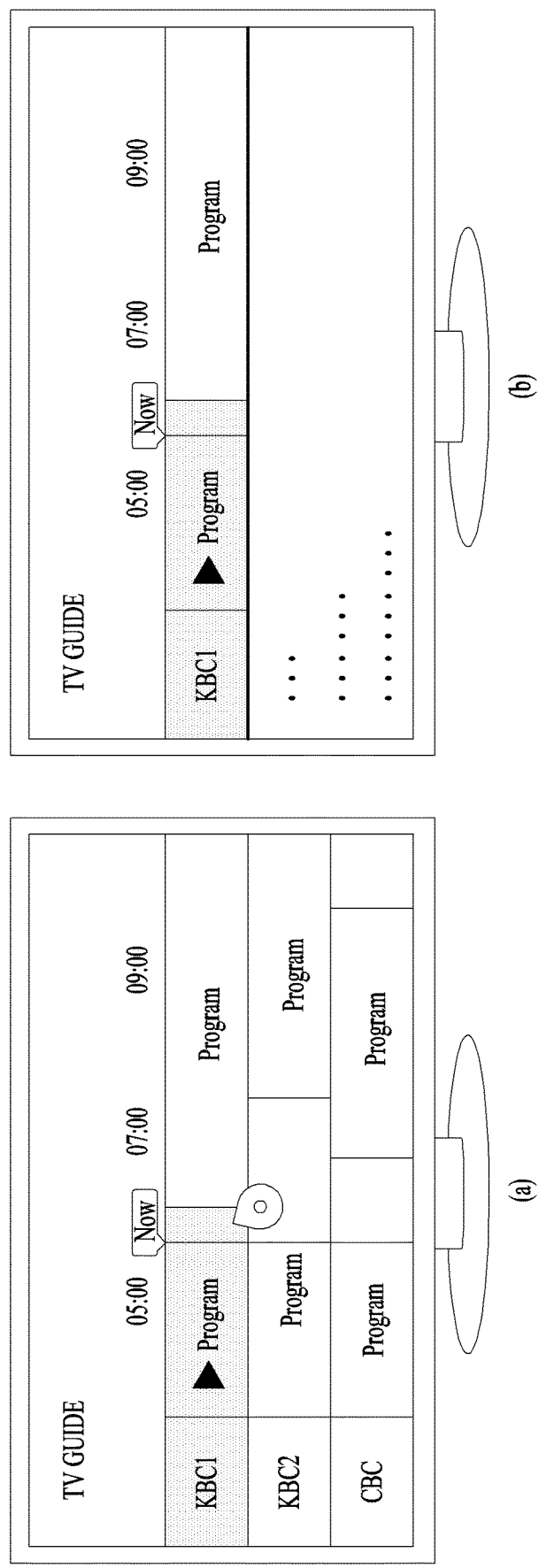

FIG. 13 and FIG. 14 are diagrams to describe a process for outputting additional information in the course of running an application in a digital device in association with the present invention.

Referring to FIG. 13 (a), while an application is run in a digital TV, i.e., a TV service is being provided, if an input is received through a pointer or a key input of a control means, the currently run TV service, i.e., information on a channel or a broadcast program is outputted. Here, the information includes various informations (e.g., channel name, broadcasting station name, program title, volume control icon, program end icon, etc.) related to the corresponding application and is outputted to a screen of the currently run application by overlay.

Referring to FIG. 13 (b), while an application is run in a digital TV, if a menu request is received, the requested menu is provided to a screen. As shown in the drawing, a called-out menu overlaps with a partial or whole region of a currently run application screen.

FIG. 14 (a) shows an EPG application running screen according to an EPG launch request in the course of running an application in a digital TV. And, FIG. 14 (b) shows a screen providing detailed information in response to a selection in case of selecting a specific item on the EPG application of FIG. 14 (a).

Here, the aforementioned content information (e.g., channel, etc.) and the additional information (e.g., EPG application, etc.) are provided in response to a users request. Yet, as shown in the drawing, a region overlapping with a currently run application partially or entirely is generated and becomes a viewing interruption element of the currently run application in the course of providing the additional information.

Figure 15:
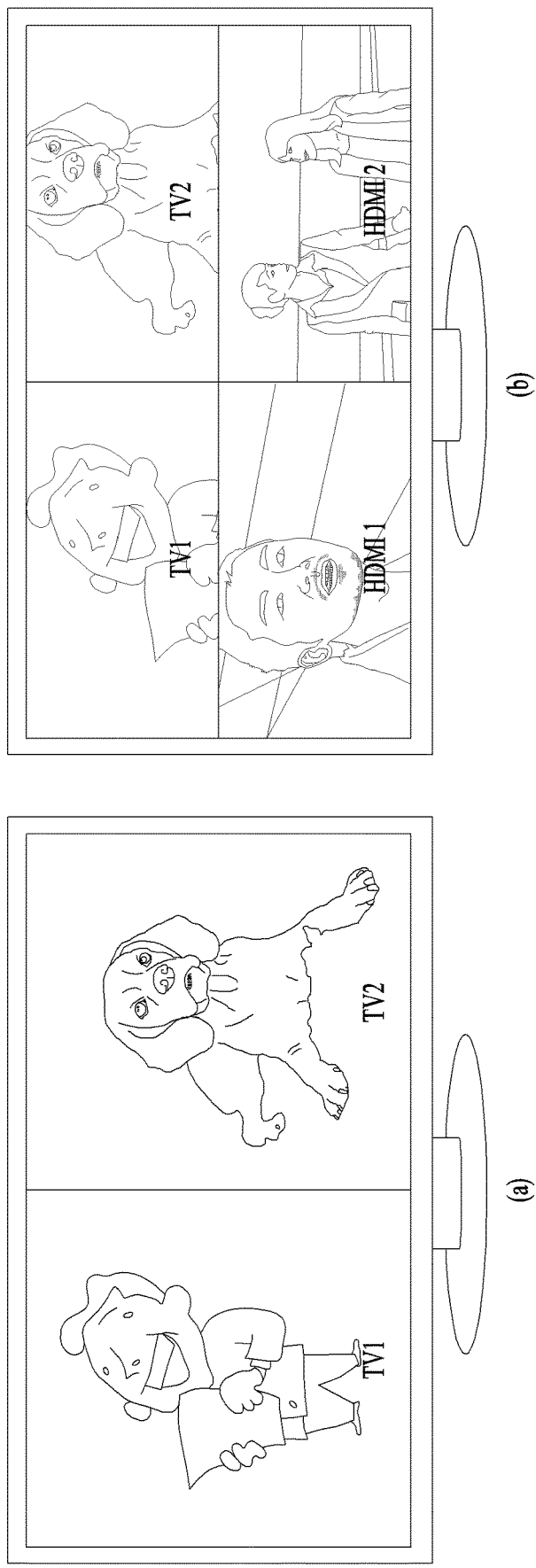
FIG. 15 is a diagram to describe a method of providing a screen of a digital device capable of processing a multitude of applications simultaneously according to one embodiment of the present invention.

FIG. 15 is a diagram to describe a method of providing a screen of a digital device capable of processing a multitude of applications simultaneously according to one embodiment of the present invention.

Referring to FIG. 15, a digital device uses screen partition in order to provide a multitude of applications simultaneously.

Referring to FIG. 15 (*a*), a digital device partitions a screen into 2 parts and provides a TV1 application running screen and a TV2 application running screen to a first partition region and a second partition region, respectively.

Referring to FIG. 15 (*b*), a digital device partitions a screen into 4 parts and provides a TV1 application running screen, a TV2 application running screen, an HDMI1 application running screen and an HDMI2 application running screen to a first partition region, a second partition region, a third partition region and a fourth partition region, respectively.

As described in FIG. 15, by partitioning a screen into 2 or 4 parts (by which the partitioning is non-limited), a digital device can provide a multitude of applications simultaneously. Hence, although a multitude of applications are requested, the digital device can provide a multitude of applications simultaneously without ending or switching a specific application to background.

Yet, although the digital device takes a screen partitioning of a large screen as an example, the digital device has difficulty in complying with a user's request by partitioning a screen only in consideration of a resource of a device and the like let alone a size (e.g., a large screen, a small screen, etc.) of a screen.

As described above, in case of screen partitioning, the digital device needs to be supported by a hardware resource. For example, FIG. 16 is a block diagram to describe a hardware resource of a digital device capable of screen partition processing according to one embodiment of the present invention.

Meanwhile, when a multitude of applications are provided simultaneously or sequentially, regarding the item considered together with the support of the hardware resource, as an application is distributively provided to display windows in size smaller than that of an indication display window according to the screen partitioning, an image quality may be degraded depending on a source. For example, when each application source is SD (Standard Definition). HD (High Definition), or FHD (Full-HD) (1920×1080), if it is partitioned into 2 or 4 parts like FIG. 15 (*a*) or FIG. 15 (*b*), resolution is lowered. Hence, although they are simultaneously provided through display windows, respectively, it may be difficult to recognize them or inconvenient to watch them. This may enable a user, who can experience ultra high resolution data like FHD, or UD (ultra definition) or UHD (ultra high definition) having definition of 4 k 16 k (8 k) (or higher) of the FHD, to feel considerable degradation of resolution. Hence, as screen partitioning works as viewing interruption, it causes inconvenience in using a corresponding function and the like. Thus, use frequency of the function is lowered, thereby generating product dissatisfaction such as cost-effectiveness and the like.

Figure 16:
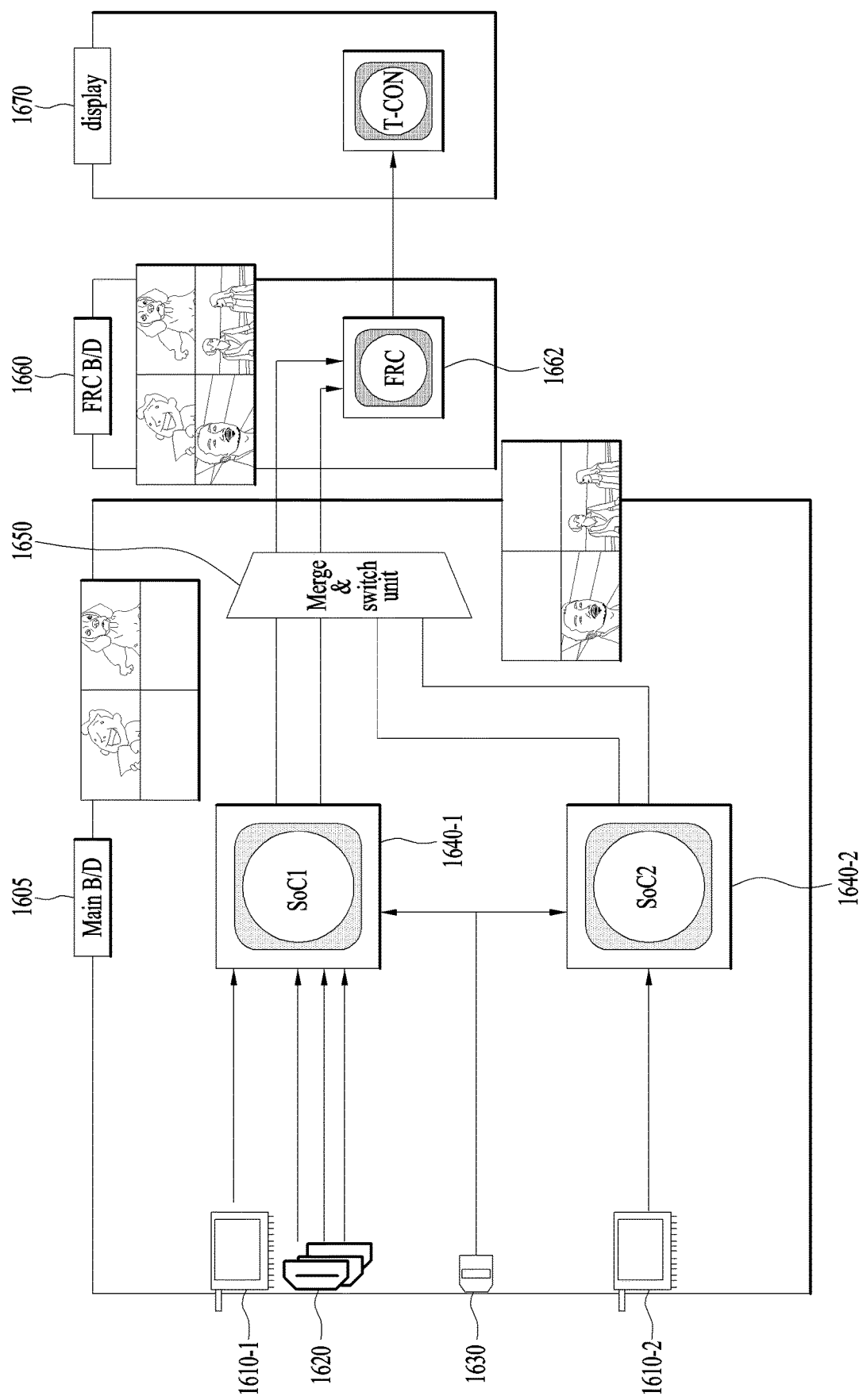
FIG. 16 is a block diagram to describe a hardware resource of a digital device capable of screen partition processing according to one embodiment of the present invention.

Referring to FIG. 16, a hardware resource of a digital device for processing screen partition is mainly divided into 3 parts such as a main board 1605, an FRC board 1650 and a display unit 1660.

The main board 1605 is a processing unit configured to process an inputted signal. The main board 1605 may include a plurality of tuners 1601-1 and 1601-2, at least one external input interface unit 1620, an ethernet interface 1630, a first SoC (system on Chip) 1640-1, a second SoC 1640-2, a merge & switch unit 1650 and the like. Here, the components of the main board 1605 are described by illustrating components related to a screen partition processing only. And, some of the components may be omitted or added.

The tuner 1610-1/1610-2 receives a broadcast signal of a specific channel through a medium such as terrestrial, cable or the like and then delivers the received signal to the SoC 1640-1/1640-2. Each of the tuners 1610-1 and 1610-2 may include a dual-tuner. The external input interface unit 1620 provides an interfacing environment with at least one external input device like HDMI input, receives data from the interfaced external input device, and forwards the received data to the SoC 1620-1 or/and the SoC 1620-2. In FIG. 16, as the external input interface unit 1620 is connected to the first SoC 1640-1, data of the external input device is forwarded to the first SoC 1640-1. Instead, the external input interface unit 1620 may be connected to the second SoC 1640-2. If there are a plurality of external inputs through the external input interface unit 1620, each external input may be connected to each SoC. Meanwhile, the Ethernet interface 1640 is connected to an Internet network or the like, receives ID datagrams delivered through the network, and forwards them to at least one SoC 1640-1 or 1640-2.

Meanwhile, in the present specification, according to one embodiment, the signals inputted through the receiving unit, i.e., the tuners 1610-1 and 1610-2, the external input interface 1620, and the ethernet interface 1630 are the received UHD contents. For example, RF signals of 4K and 60 Hz are received through the tuners 1610-1 and 1610-2, and HDMI signal of 4 k and 60 Hz is received through the HDMI interface 1620.

The SoC 1640-1/1640-2 may be a chip including various components such as a demodulating unit, a demultiplexing unit, an A/V decoder, a control unit and the like as well as the tuner and the like shown in FIGS. 2 to 5. Hence, functions or roles of the respective components refer to the aforementioned substance. If details of the respective components are necessary, they shall be described later at the corresponding parts and overall details shall be omitted. Meanwhile, the first SoC 1620-1 and the second SoC 1640-2 may include the same components or different components.

The function or role of each SoC may differ depending on a source connected to the corresponding SoC 1640-1/1640-2. Referring to FIG. 16, the first SoC 1640-1 is connected to the first tuner 1610-1, the external input interface 1620 and the Ethernet interface 1630, and the second SoC 1640-2 is connected to the second tuner 1610-2 and the Ethernet interface 1630. Hence, what kind of SoC will be activated can be determined depending on whether data is inputted through a prescribed source, by which the present invention is non-limited. For example, in case that data are simultaneously inputted through the first tuner 1610-1 and the external input interface 1620, the first SoC 1640-1 is responsible for the inputted data and is able to handle the inputted data. Yet, one part of a screen partitioned into 2 parts is forwarded from the first SoC 1640-1 to the second SoC 1640-2 and then merged and processed by the merge/switch unit 1650, and vice versa. Referring to FIG. 16, for example, when 4 input sources exist and are simultaneously processed through a 4-partitioned screen, data related to a 2-partitioned screen is processed by the first SoC 1640-1 and the rest are processed by the second SoC 1640-2. The data are merged and processed by the merge/switch unit 1650 and then forwarded to the FRC board 1660.

An FRC processing unit 1662 within the FRC board 1660 receives a signal inputted through the merge/switch unit 1650 and then converts it to fit an output format. Such a converted data is outputted through the display unit 1670.

Figure 17:
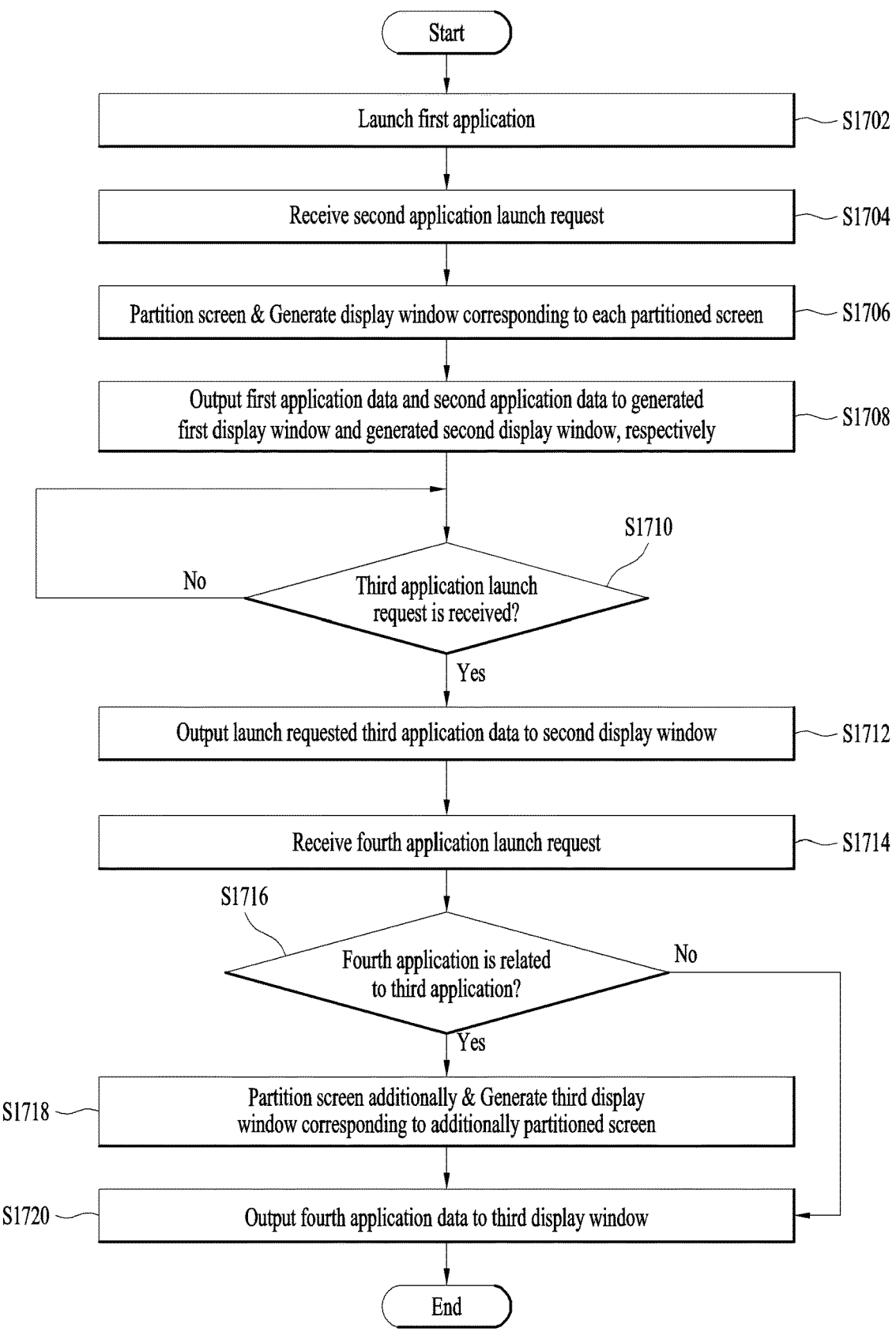
FIG. 17 is a flowchart for a method of processing partition screen data in response to a situation in a digital device according to one embodiment of the present invention.
Figure 18:
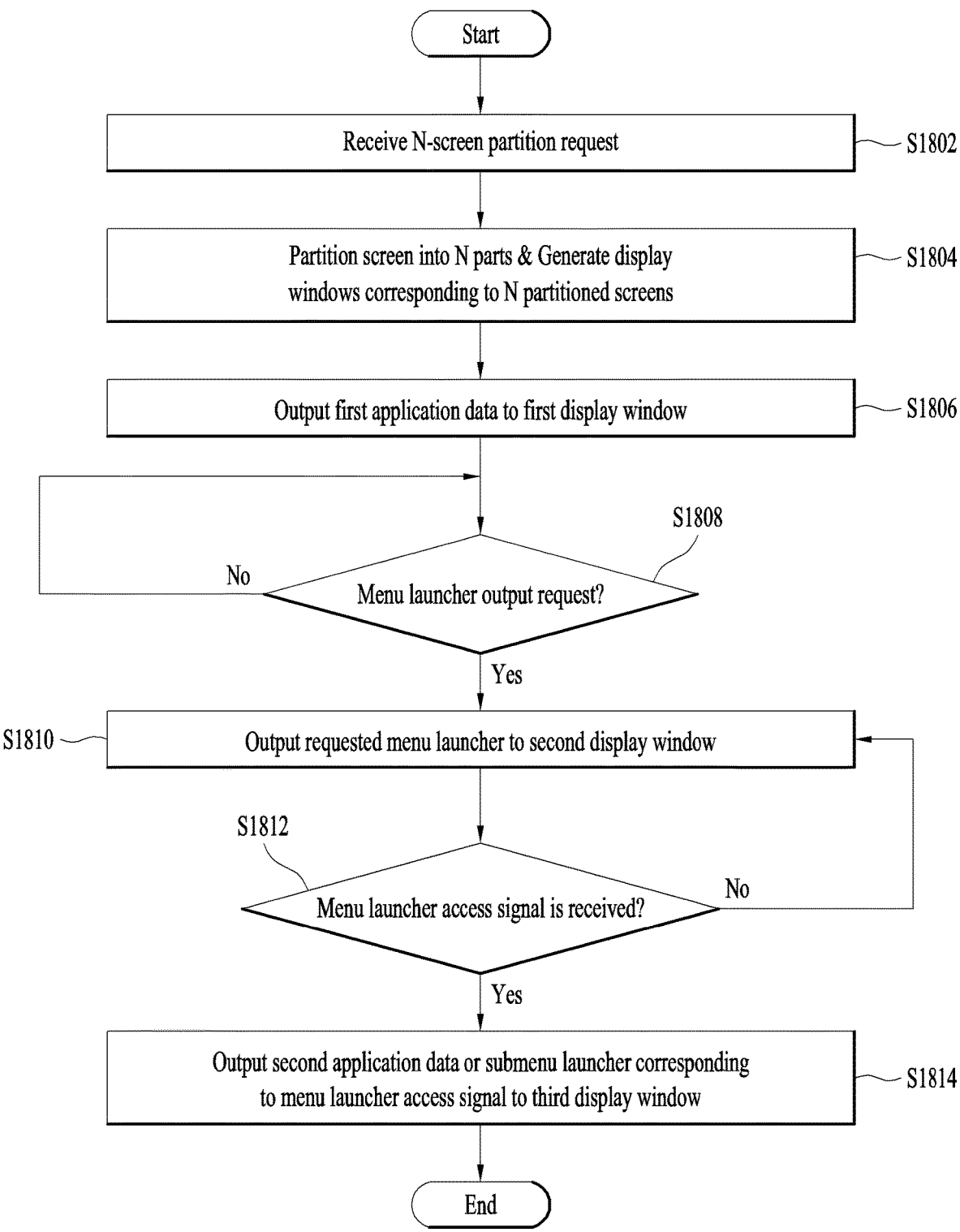
FIG. 18 is a flowchart for a method of processing partition screen data in response to a situation in a digital device according to another embodiment of the present invention.

FIG. 17 is a flowchart for a method of processing partition screen data in response to a situation in a digital device according to one embodiment of the present invention. And, FIG. 18 is a flowchart for a method of processing partition screen data in response to a situation in a digital device according to another embodiment of the present invention.

Referring to FIG. 17, first of all, a digital device launches a first application [S1702].

While the first application is run, if a second application launch request is received [S1704], the digital device partitions a screen in response to the second application launch request. And, the digital device generates a first display window and a second display window corresponding to the partitioned screen [S1706].

The digital device outputs a first application data and a second application data to the first display window and the second display window generated in the step S1706, respectively [s1708].

In the above course of partitioning the screen and running the first and second applications through the display windows of the partitioned screen, if a third application launch request is received [S1710]. The digital device outputs a third application data to the second display window [S1712]. Namely, the newly launch-requested application is outputted to the previously generated display window. Hence, in the step S1712, the third application data may be outputted not to the second display window but to the first display window. This may be determined according to a type or attribute of the third application. For example, if the third application is related to the first application, it is preferable outputted to the second display window so as to be outputted together with the first application, and vice versa.

Thereafter, if a fourth application launch request is received [S1714], the digital device outputs a fourth application data [S1720]. Yet, in outputting the fourth application data, the digital device may determine whether the launch requested forth application is the application related to the third application data [S1716]. As a result of the determination, if the fourth application is related to the third application, since it is preferable that the two applications are simultaneously outputted to the screen. The previously generated first display window may be used. Instead, the digital device partitions the screen additionally, generates a third display window corresponding to the additionally partitioned screen [S1718], and then outputs the fourth application data to the generated third display window [S1720].

One embodiment of the present invention is described with reference to FIG. 17, which is non-limited by the above description. For example, in case that a plurality of applications are requested to be simultaneously launched, whether to partition a screen is determined in consideration of relation between a launch requested application and a currently run application and the like, a display window for a screen partitioned according to the determination is generated, and a corresponding application data is then outputted. For example, in the step S1704, if the second application launch request is received, it is not necessary to perform screen partitioning. Instead, the second application may be substituted for the first application. In case of the fourth application launch request, relation to the first and second applications can be examined as well as relation to the third application.

Meanwhile, in the present specification, it is not necessary for an application to mean a broadcast program, a VOD, a web browser, a video or the like only. And, an application can be used to mean all types of data (e.g., menu, EPG, etc.) providable by a digital device. For example, in FIG. 17, each of the first application and the second application may include one of an application for a TV service, an application for external input data, an application for IP datagram, an application installed after download, a VOD application, a game application and a web browser application. The third application may include one of an application of the same type of the first or second application and a menu application. And, the fourth application may include an application of the same type of one of the first to third applications. If the third application is a menu application, the fourth application may include a submenu application.

A method of processing data in a digital device according to another embodiment of the present invention is described with reference to FIG. 18 as follows. FIG. 18 shows how to provide a launch requested application data in a screen partitioned state, whereas FIG. 17 shows a method of processing application data through a partitioned screen in a manner of partitioning a screen in response to an application launch request.

If N-screen partition request is received [S1802], the digital device generates N display windows for the respective partitioned screens in response to the screen partition request [S1804]. Then, the digital device outputs a first application data to a first display window [S1806].

Subsequently, if a menu launcher (or, web launcher) output request is received [S1808], the digital device outputs the requested menu launcher to a second display window [S1810]. If a menu launcher access signal is received [S1812], the digital device outputs a second application data selected from the menu launcher or submenu items selected from the menu launcher to a third display window [S1814].

For clarity, with reference to FIG. 18, described is a method of outputting a menu launcher related to the entire or single application data and submenu launcher data of the menu launcher in the course of outputting one or more application data to the partitioned screen. Yet, applications other than the menu launcher can be processed in the same or similar manner.

In the following description, embodiments for various processing scenarios according to the aforementioned method shown in FIG. 17 or FIG. 18 or a combination of the methods shown in FIG. 17 and FIG. 18 are described with reference to the accompanying drawings. Meanwhile, for clarity, in order to help the understanding of the present invention, the following description is made by taking a 4-partitioned screen as an example, by which the present invention is non-limited.

FIGS. 19 to 29 are diagrams to describe a method of processing partition screen data in response to a situation in a digital device according to one embodiment of the present invention.

Figure 19:
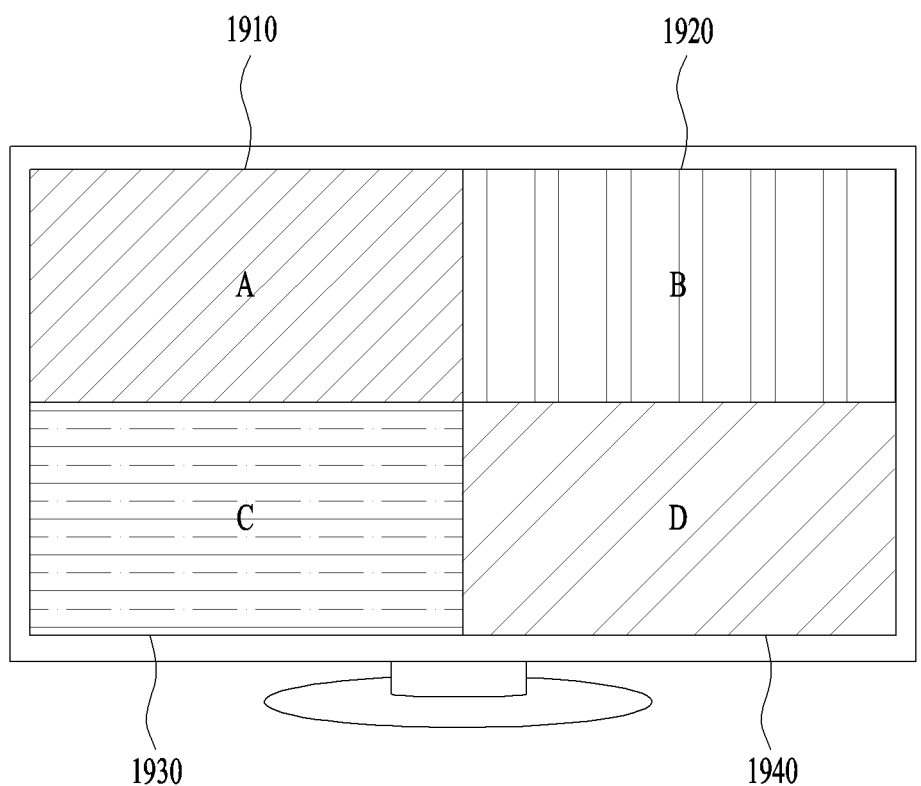

Referring to FIG. 19, it can be observed that a screen is partitioned into 4 regions 1910, 1920, 1930 and 1940. An application may or may not be outputted to each of the regions. In FIG. 19, an application A is outputted to a first partitioned region 1910 through a first display window, an application B is outputted to a second partitioned region 1920 through a second display window, an application C is outputted to a third partitioned region 1930 through a third display window, and an application D is outputted to a fourth partitioned region 1940 through a fourth display window.

Referring to FIG. 20 (a), applications are outputted to 4-partioned screen. In doing so, if a user requests an EPG application through a control means, as shown in FIG. 20 (a), the EPG application is outputted to a first display window 2010 of a first partitioned region. Thus, the EPG application outputted to the first display window 2010 can move to a second display window of a second partitioned region like FIG. 20 (b), a third display window of a third partitioned region like FIG. 20 (c), or a fourth display window of a fourth partitioned region like FIG. 20 (d). So to speak, by dragging & dropping the EPG application outputted to the first display window 2010 using a control means like FIG. 20 (a), the EPG application can be moved like FIGS. 20 (b) to 20 (d). Meanwhile, the EPG application may be provided to a previously generated display window in a manner of switching an application of a corresponding partitioned region to background and replacing the application in foreground. Alternatively, a display window newly generated for the EPG application may be outputted by overlaying the corresponding region.

On the contrary, while an application is outputted to all partitioned regions, if an EPG application launch request is received, the digital device can output the PEG application to a display window previously generated on one of the partitioned regions shown in FIGS. 20 (a) to 20 (d) or another display window that is newly generated.

In FIG. 20 or the following embodiments, as described above, a movement of a display window or a movement of an output region of an application may be performed through a control means. Moreover, such movements may be performed through a gesture command through a camera sensor, a voice command, an eye-tracking command through an eye-tracking sensor, combinations thereof, etc.

Figure 21:
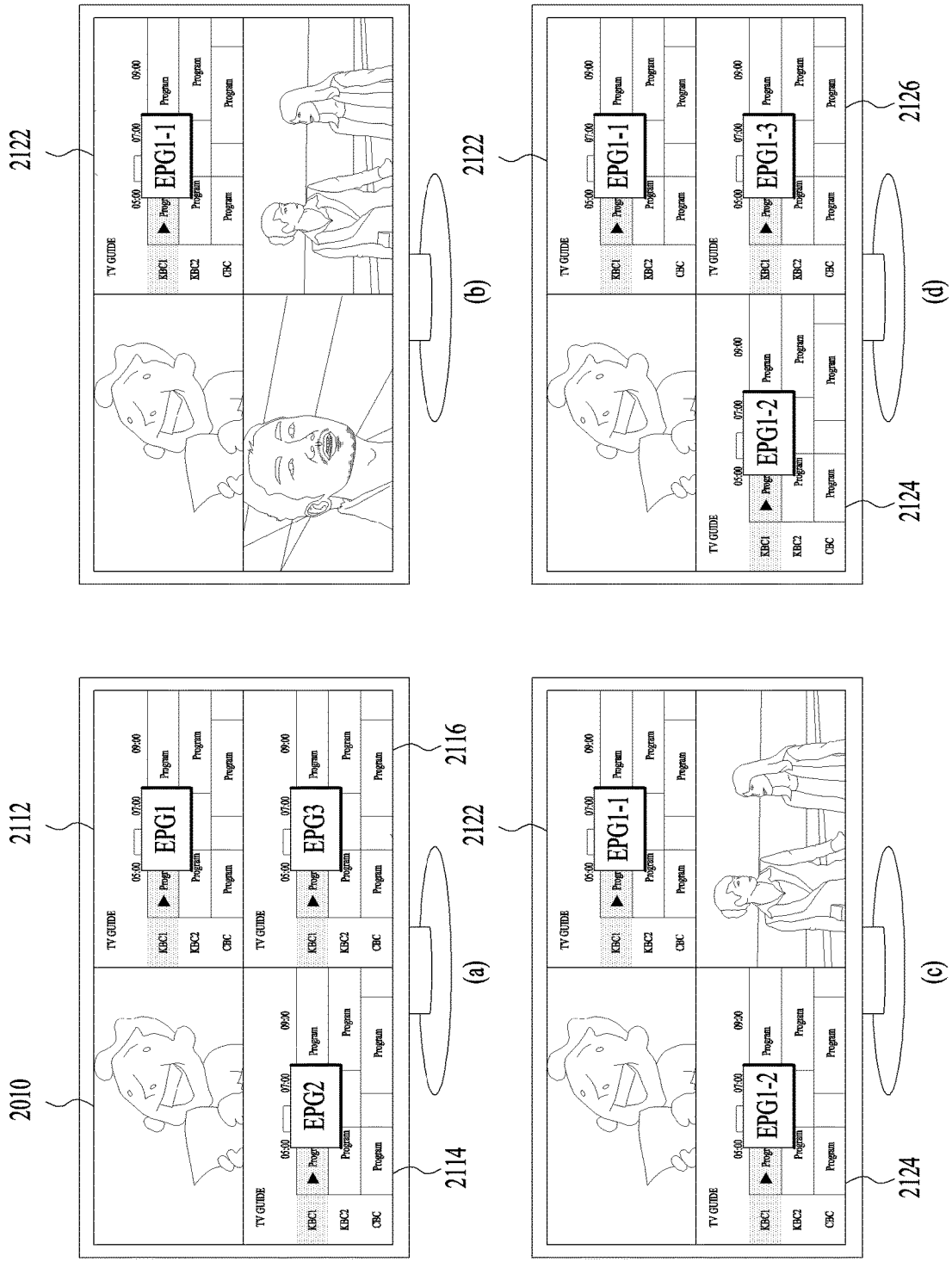

Referring to FIG. 21 (a), an application is outputted to a first partitioned region 2110, and EPG applications are simultaneously provided to second to fourth partitioned regions 2112, 2114 and 2116, respectively. Here, each of the EPG applications may include an EPG application for an application of a corresponding region to which the EPG application is outputted. For example, an EPG application outputted to the second partitioned region 2112 is an EPG application of an application currently provided to the region 2112 and may be formed by referring to the related EPG data sorted by a channel, broadcasting station and content related to the corresponding application and the like. Hence, an EPG application provided to each partitioned region may output different EPG data according to an application currently run in the corresponding region.

Meanwhile, FIGS. 21 (b) to 21 (d) show a processing method for a single EPG application. Namely, after an EPG application has been provided, sub EPG data related thereto are provided to different partitioned regions according to an access signal to the EPG application. If data of EPG 1-1 application (main or initial EPG) 2122 is provided to a second partitioned region and a prescribed item within the EPG 1-1 application 2122 is acceded [FIG. 21 (b)], the digital device provides EPG 1-2 application 2124 to a third partitioned region in response to the access signal. If the EPG 1-2 application 2124 is accessed, the digital device provides EPG 1-3 application 2124 to a fourth partitioned region [FIG. 21 (d)]. Here, the EPG 1-1 application of FIG. 21 (b) may be accessed again instead of a prescribed item within the EPG 1-2 application 2124 in FIG. 21 (c). In this case, it can be processed like FIG. 21 (d).

Meanwhile, while EPG application is provided to all partitioned regions or all partitioned regions except one, a screen may be further partitioned for an access signal of an added EPG application, or currently provided other EEG application data may be provided in a manner of being substituted in part. So to speak, in a specific partitioned region, a multitude of same or different application data can be provided by being stacked in a hierarchical or layered structure. In this case, how many layers are stacked in the corresponding partitioned region can be denoted by a numeral and the like to facilitate recognition. Besides, application data may be provided across all partitioned regions (e.g., hierarchical structure at a screen center, etc.).

In other words, in the embodiments disclosed in the present specification, a partitioned screen, i.e., each partitioned region can provide one or more display windows. Meanwhile, in FIG. 17 or FIG. 18, if an application launch request is received, a digital device determines whether a maximum number of available partitioned screens is exceeded. If it is the maximum number of the available partitioned screens as a result of the determination, the digital device generates a separate display window from a screen center or a previously partitioned screen in response to an added application launch request and then outputs the requested application data. Besides, if a received application launch request is related to a currently run application, the digital device may output the requested application data to a non-overlapping partitioned screen or the display window separately generated on the partitioned screen of the currently run application in a hierarchical structure. Then, the digital device outputs an identifier for identifying a hierarchical structure and is able to switch an application of a layer other than a most upper layer to a background.

Figure 22:
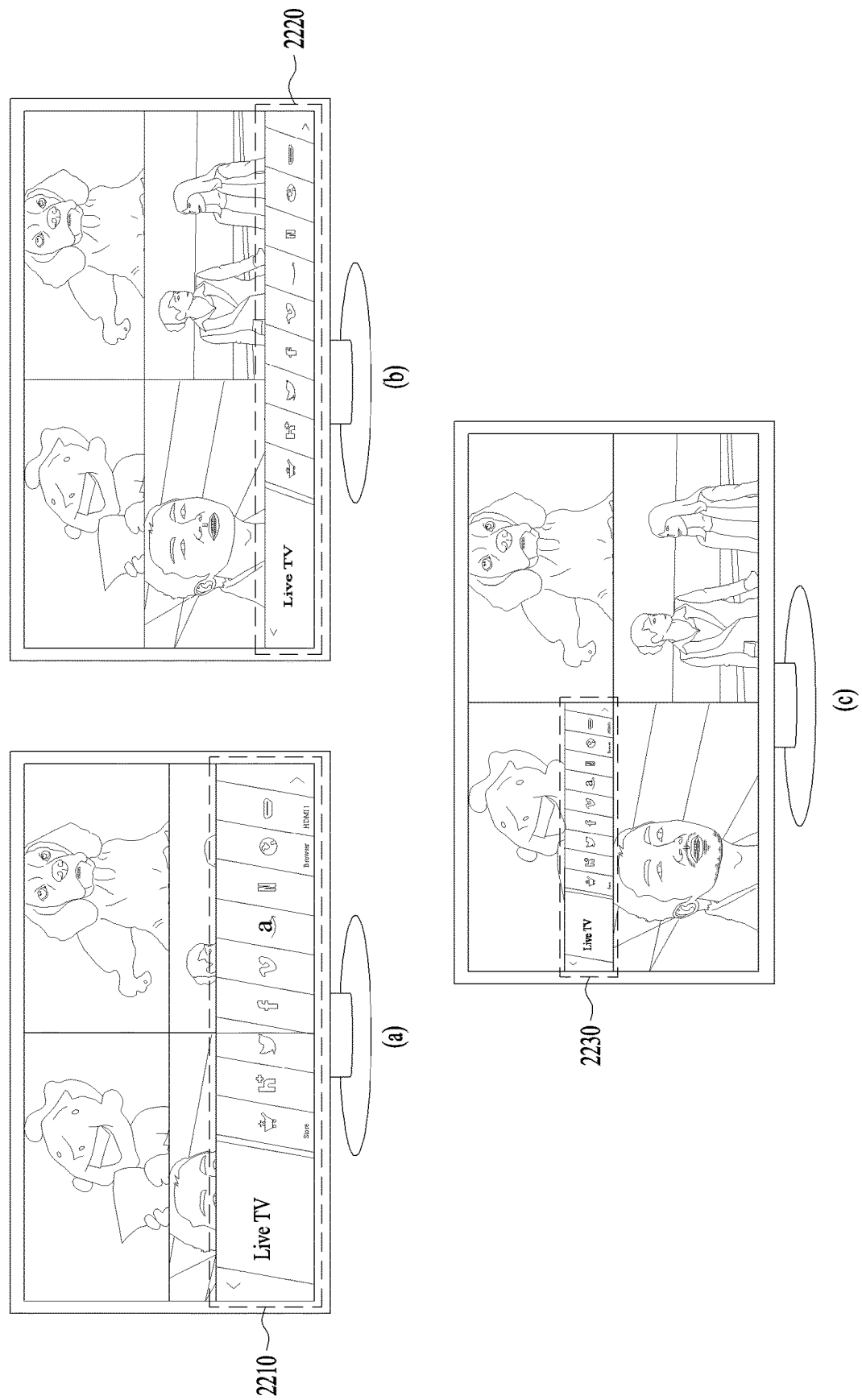

While a screen is partitioned, if a web launcher supportive of WebOS or a menu launcher is requested, a method of processing the request is shown in FIG. 22.

In FIG. 22 (a), a digital device provides a menu launcher 2210 to a prescribed region of a bottom end of a screen. Yet, in this case, the provided menu launcher 2210 has an overlapping region with a partitioned region and the menu launcher 2210 is outputted in a manner of overlaying a layer upper than data on the overlapping partitioned region. Hence, data of some of partitioned regions are blocked in part.

On the other hand, in FIG. 22 (b), unlike FIG. 22 (a), the digital device provides the called-out menu launcher 2220 not to overlap with the partitioned regions. Hence, to this end, like FIG. 22 (b), the digital device can provide the partitioned regions by adjusting sizes of the partitioned regions and the like.

Meanwhile, in FIG. 22 (c), a menu launcher 2230 is provided to a specific partitioned region. In this case, the provided menu launcher 2230 can first list and provide data related to an application on the corresponding region.

Figure 23:
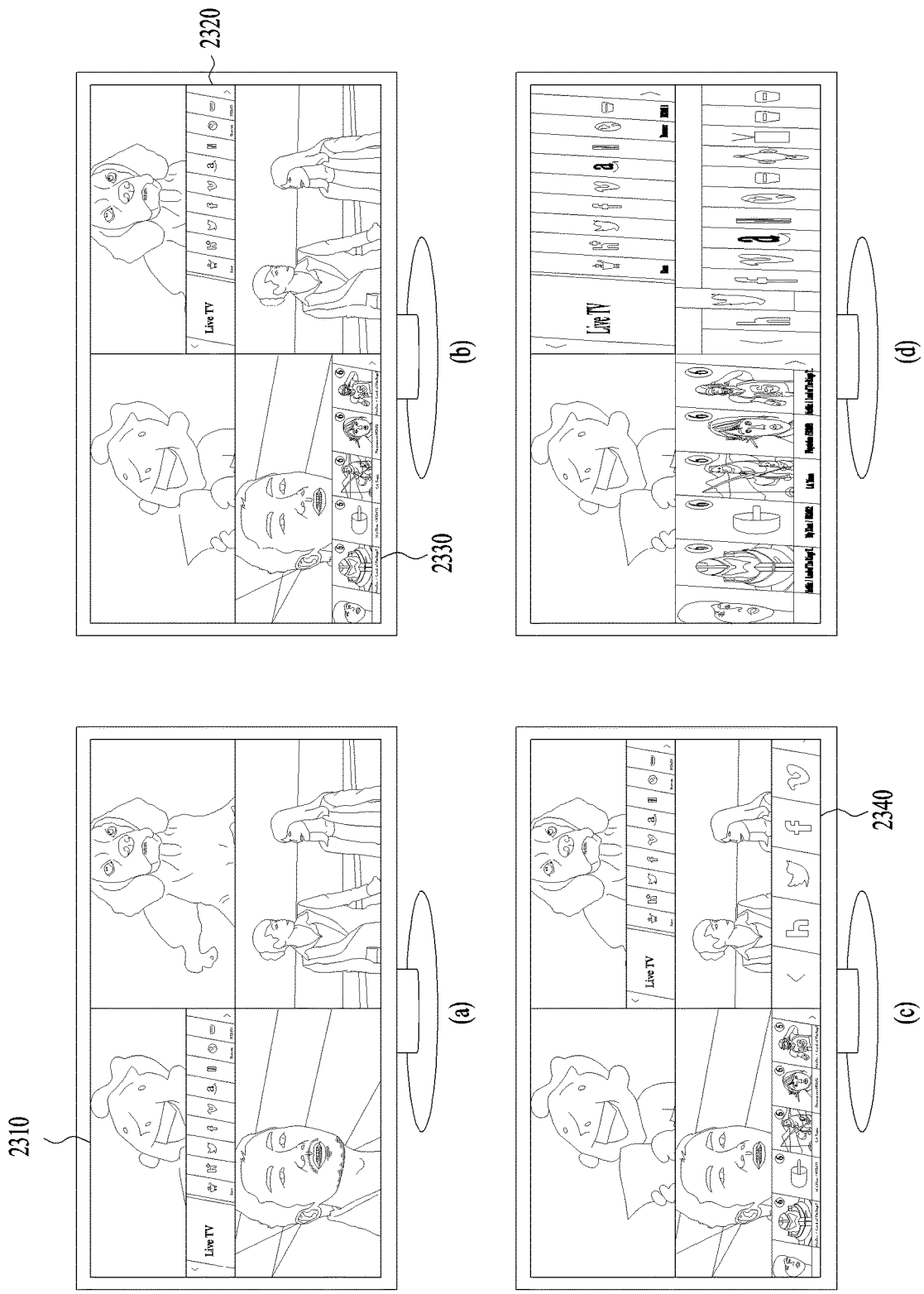

In FIG. 23 (a), a menu launcher 2310 is provided to a specific region like FIG. 22 (c). Such a menu launcher is movable to another partitioned region as mentioned in FIG. 20. Meanwhile, as shown in FIG. 23 (a), an initial page of the menu launcher 2310 is provided by including a history menu item for a previously viewed channel or an application such as a program and the like and an application list menu item available in a device. Meanwhile, to a left side of the history menu item, a menu item 2330 including viewed data lists before a previously viewed data is provided. And, to a right side of the application list menu item, additionally available application list menu items 2340 are provided.

Referring to FIG. 23 (*b*), the digital device provides a menu launcher 2320 to a second partitioned region. Here, if a menu item 2330 for the previously viewed data list mentioned in the foregoing description is accessed, the menu launcher 2320 of the second partitioned region may be changed but is provided to a third partitioned region in FIG. 23 (*b*).

FIG. 23 (*c*) shows an embodiment of if an additional application list menu item 2340 of a previously provided menu launcher 2320 is acceded in a digital device, providing it to a fourth partitioned region.

Meanwhile, FIG. 23 (*d*) shows a screen providing each menu item to overlay a whole corresponding partitioned region instead of overlying a partial region of the corresponding partitioned region.

Besides, FIG. 23 (*c*) or FIG. 23 (*d*) shows an embodiment of providing all accessible menu items to partitioned regions on a menu launcher automatically, collectively and simultaneously in response to an initial menu launcher request, respectively.

Figure 24:
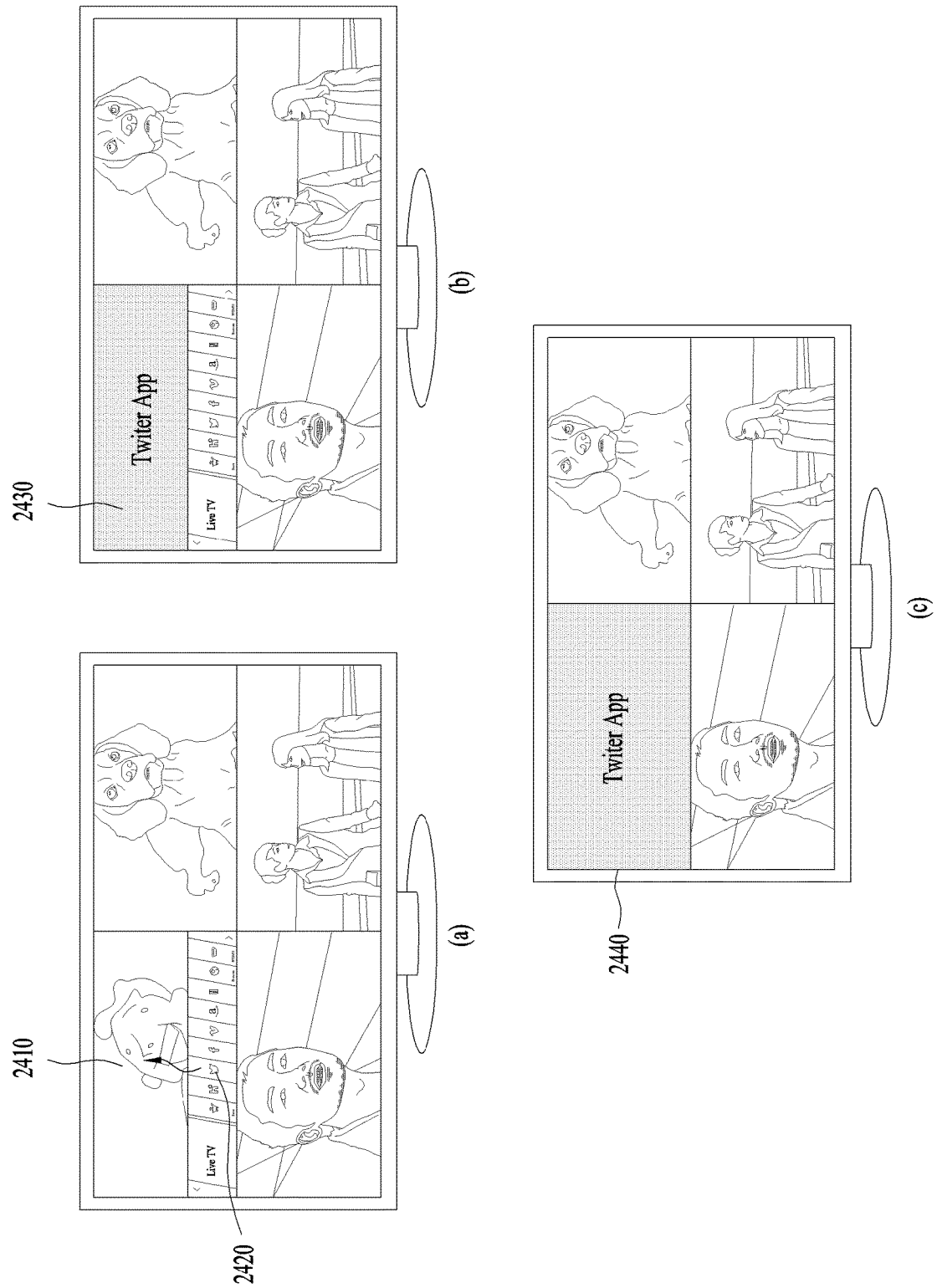

In FIG. 24 (*a*), like the aforementioned FIG. 22 (*c*) or FIG. 23 (*a*), while a menu launcher is provided to a first partitioned region, if a specific menu item 2420 on the menu launcher is selected, an application (e.g., Twitter application) corresponding to the selected menu item 2420 may be launcher. For example, as shown in FIG. 24 (*a*), if the specific menu item 2420 is selected from the menu launcher provided to the first partitioned region, an application corresponding to the selected menu item 2420 can be launched in the first partitioned region 2430 like FIG. 24 (*b*) on behalf of an application currently run in the first partitioned region 2410. The menu launcher continues to be provided to the first partitioned region in FIG. 24 (*b*), but may disappear like FIG. 24 (*c*).

Meanwhile, an application corresponding to a menu item selected from a menu launcher is provided to a corresponding partitioned region, but may be provided to another partitioned region. Or, like FIG. 24, the application in the provided state may be moved to another partitioned region.

Figure 25:
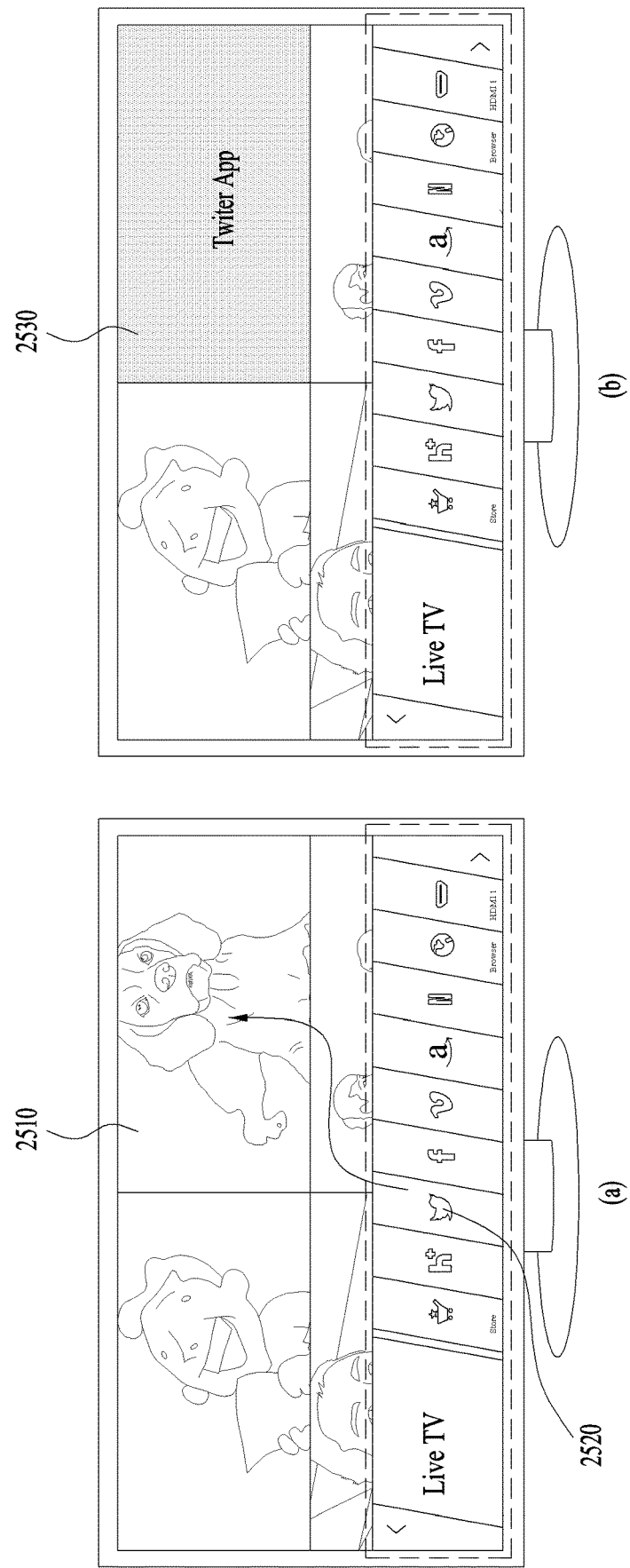

On the other hand, in FIG. 25, a menu launcher is provided like FIG. 24, but may be provided like FIG. 22 (*a*) or FIG. 22 (*b*) instead of being provided to a specific partitioned region. In this case, as described in FIG. 24, if a specific menu item on a menu launcher is selected and a partitioned region is designated, an application corresponding to the selected menu item can be provided to the designated partitioned region. Referring to FIG. 25 (*a*), while a menu launcher is provided in the same manner as shown in FIG. 22 (*a*), if a specific menu item 2520 is selected and a second partitioned region 2510 is designated by drag & drop and the like, a Twitter application 2530 is launched on the designated second partitioned region like FIG. 25 (*b*).

Figure 26:
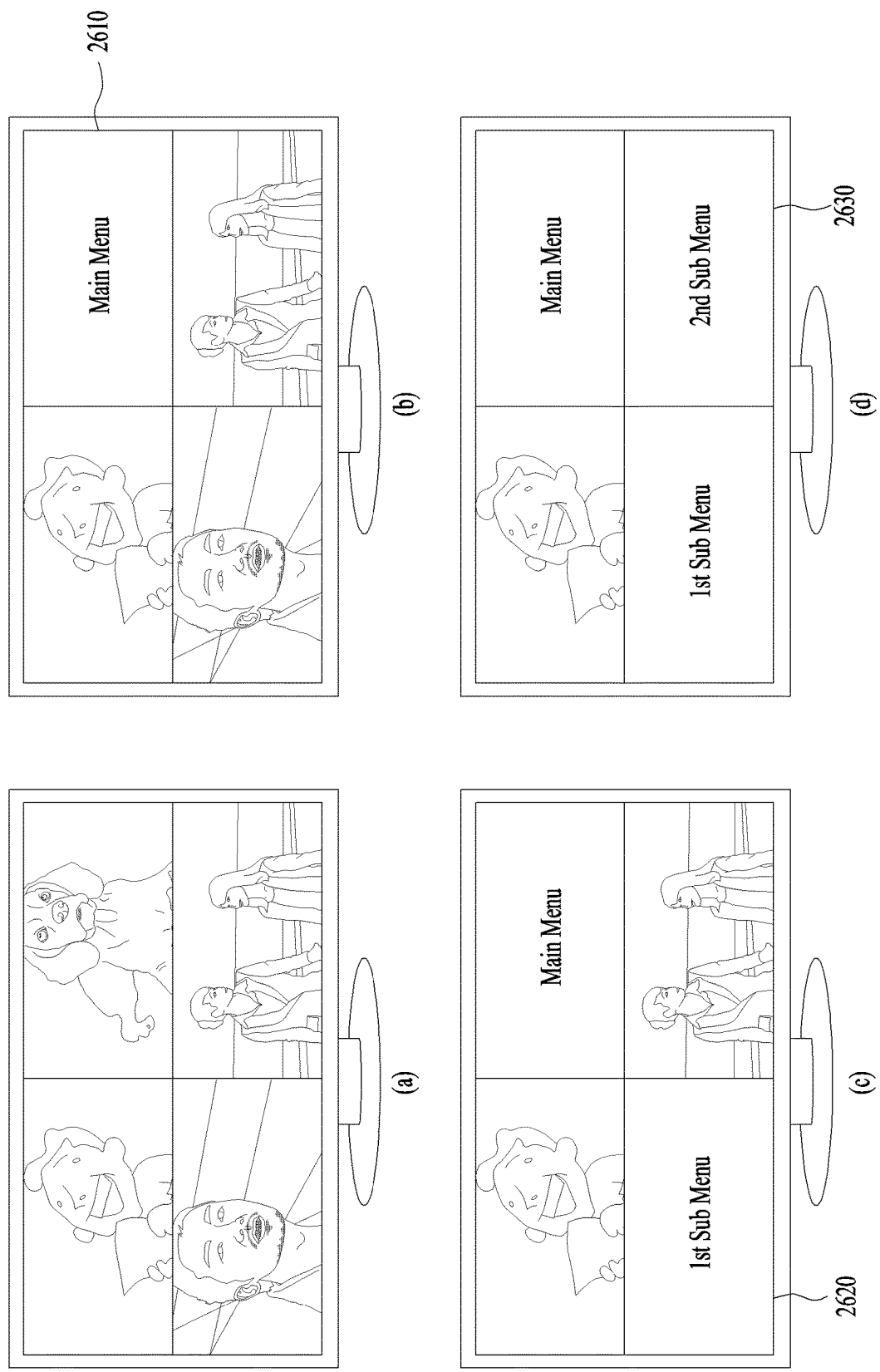

FIG. 26 shows an embodiment of processing a menu application and a submenu application of the menu application. Here, a submenu application may mean a submenu item provided according to a menu item selection of a menu application.

While applications are provided to 4-partioned regions, respectively [FIG. 26 (*a*)], if a menu application is requested, the menu application (main menu) 2610 is provided through a display window separately generated on a second partitioned region [FIG. 26 (*b*)]. If a prescribed menu item is selected from menu items on the menu application 2610, a submenu item (first submenu) corresponding to the selected menu item is provided to a third partitioned region 2620 [FIG. 26 (*c*)]. If a specific menu item is selected again in FIG. 26 (*b*) or FIG. 26 (*c*), the digital device provides a corresponding menu item 2630 to a fourth partitioned region [FIG. 26 (*d*)].

Meanwhile, in the present specification, each partitioned region may or may not have a priority of its own. Hence, it is obvious that applications may be provided through partitioned regions, respectively.

Figure 27:
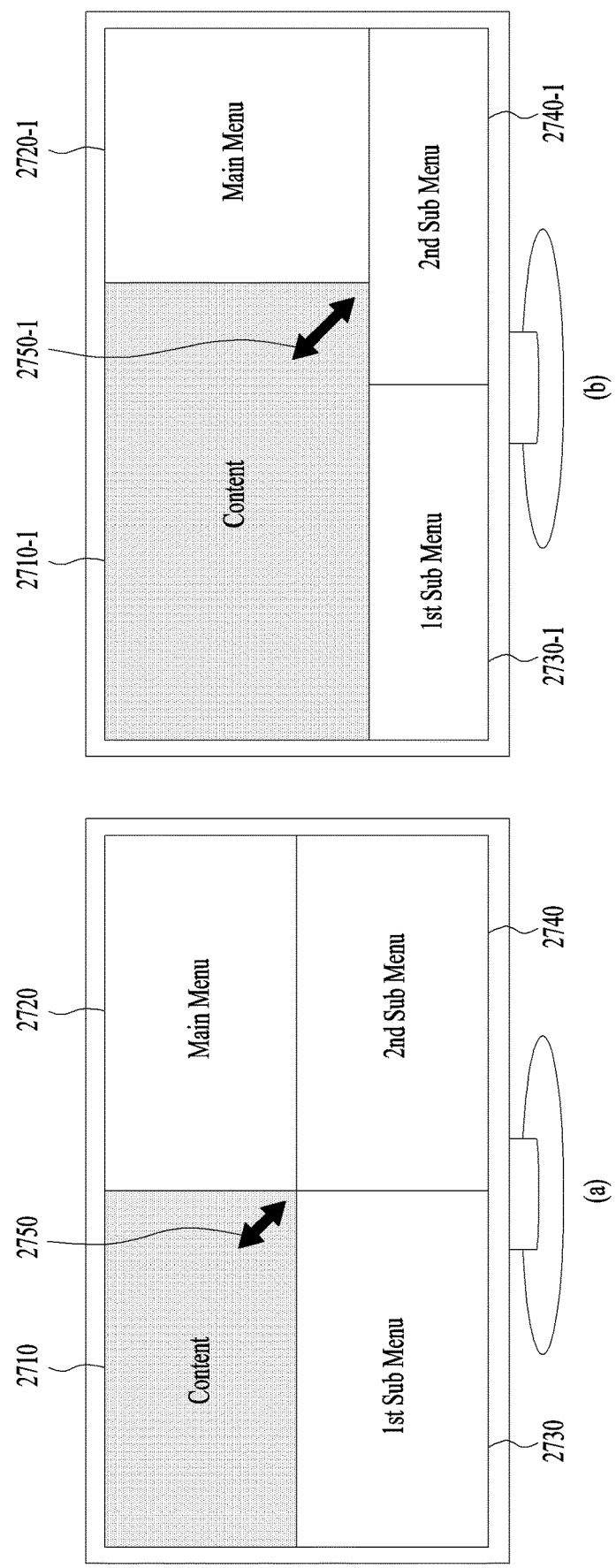

FIG. 27 shows an embodiment of a processing according to a control command for a partitioned region or a display window of the partitioned region while an application is provided to each partitioned region for example.

For instance, as shown in FIG. 27 (*a*), a content is provided to a first partitioned region 2710, a main menu is provided to a second partitioned region 2720, a first submenu is provided to a third partitioned region 2730, and a second submenu is provided to a fourth partitioned region 2740. In doing so, a digital device may provide an icon for a size change to a specific partitioned region in response to a control command request.

In this case, in a digital device, if a size of the first partitioned region 2710 is changed through a size change control icon 2750, the size of the first partitioned region 2710-2 is changed like FIG. 27 (*b*) and sizes of the rest of region, i.e., the second partitioned region 2720-1, the third partitioned region 2730-1 and the fourth partitioned region 2740-1 can be automatically adjusted according to the size change of the first partitioned region 2710-1.

Meanwhile, as the size change control of each partitioned region has a maximum value, the size cannot be changed over the maximum value. And, the size can be reduced as shown in the drawing. Moreover, a partitioned region size change like enlargement/reduction can be also achieved through a voice, a gesture, a key button of a control means and the like.

Moreover, in case of controlling a size change of a partitioned region A, if a size change control of a specific one of the rest of partitioned regions is impossible or limited, a corresponding control may be performed on another partitioned region according to the above substance. For example, when it is intended to control a size change of a main menu of a second partitioned region but a user wants to avoid interrupting a viewing of a content currently provided through a first partitioned region, if a size change control of the second partitioned region is performed, the size change of the first partitioned region can be controlled to correspond to the minimum or the first partitioned region may be processed so as not to react with the size change control.

Figure 28:
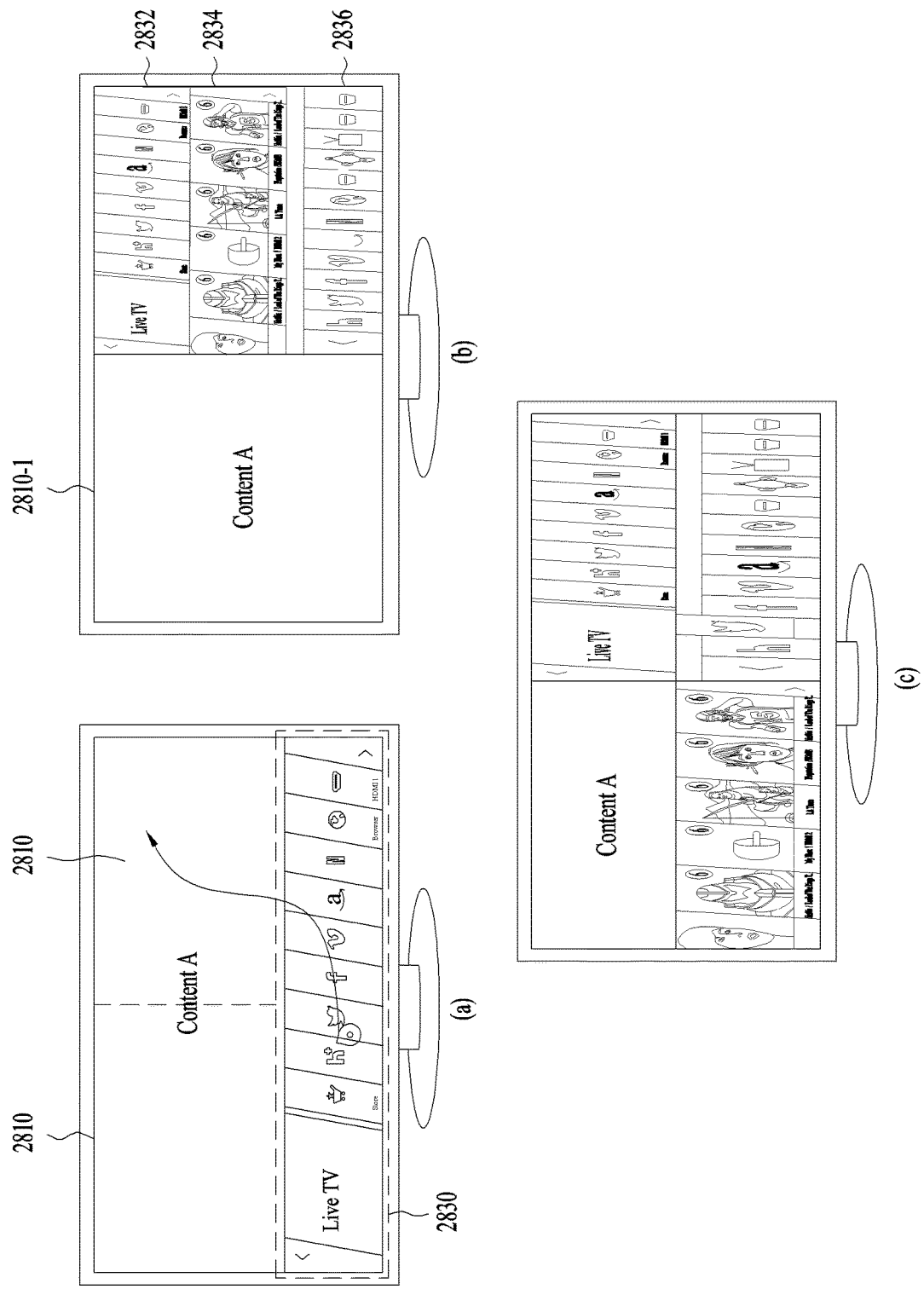

FIG. 28 (*a*) shows that, while a content is provided as a full screen 2810, a menu launcher 2830 is provided to a prescribed region of a screen by overlay. In doing so, if the menu launcher 2830 is moved to a prescribed region 2820 on the screen currently providing the content, it can be provided as FIG. 28 (*b*) or FIG. 28 (*c*).

Referring to FIG. 28 (*b*), a screen is partitioned into 2 regions and a menu launcher 2832 and submenus 2834 and 2836 of the menu launcher 2832 can be simultaneously provided, in response to a command for moving the menu launcher 2830. In doing so, of course, the submenus 2834 and 2836 may not be provided but can be provided later through an access on the menu launcher 2832.

On the other hand, referring to FIG. 28 (c), in response to a command for moving the menu launcher 2830, a screen is partitioned into 4 regions, the menu launcher is provided to a second partitioned region, a first submenu is provided to a third partitioned region, and a second submenu is provided to a fourth partitioned region.

FIGS. 29 (a) to 29 9c) show embodiments of providing different applications to partitioned regions, respectively.

Referring to FIG. 29 (a), a first broadcast program is provided to a first partitioned region, a menu launcher 2910 is provided to a second partitioned region, an EPG application 2920 is provided to a third partitioned region, and a second broadcast program is provided to a fourth partitioned region.

Referring to FIG. 29 (b), there is an embodiment of providing a web browser application 2930 to the fourth partitioned region instead of the EPG application 2920 of FIG. 29 (a).

Referring to FIG. 29 (c), unlike FIG. 29 (a) or FIG. 29 (b), a menu launcher, an EPG application and a web browser application are simultaneously provided to the rest of the partitioned regions except the first partitioned region, respectively.

In this case, each of the menu launcher 2910, the EPG application 2920 and the web browser application may include an application related to a prescribed application of the corresponding partitioned region or another partitioned region.

Besides, if a specific partitioned region is selected in FIGS. 19 to 29, 2D/3D attribute can be changed for the corresponding region and other processing such as resolution adjustment and the like can be performed individually [not shown in the drawing]. Moreover, if a prescribed partitioned region is selected and various configurations or controls exist, an application on the provided partitioned region can be configured and controlled according to the corresponding configuration or control. For example, while a main menu, a first submenu and a second submenu are provided to a second partitioned region, a third partitioned region and a fourth partitioned region, respectively, a control command for the main menu of the second partitioned region is also applicable to the third partitioned region and the fourth partitioned region in a similar manner.

At least one of FIGS. 13 to 29 may be performed by a control unit of a digital device or an SoC including the same.

MODE FOR INVENTION

A digital device disclosed in the present specification can be configured by combination of structural elements and features of the present invention. The structural elements or features may be considered selectively unless specified separately, and combined with one another to enable various modifications of the embodiments of the present invention entirely or in part.

Meanwhile, a digital device operating method of the present invention can be implemented in a program recorded medium, which can be read by a processor provided to the digital device, as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). Further, the recording medium readable by a processor is distributed to a computer system connected to a network, whereby codes readable by the processor by distribution can be saved and executed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents. And, such modifications and variations should not be individually understood from the technical idea or prospect of the present invention.

INDUSTRIAL APPLICABILITY

The present invention relates to a digital device and method of processing data therein and has industrial applicability.

What is claimed is:

1. A method of processing data in a digital device, the method comprising:
   launching a first application;
   receiving a second application launch request;
   generating a first display window and a second display window for partitioned screens by partitioning a screen in response to the second application launch request;
   displaying a first application data and a second application data in the first display window and the second display window, respectively;
   receiving a third application launch request for a third application while the first application data is displayed in the first display window and the second application data is displayed in the second display window;
   in response to determining that the third application is related to the first application data in the first display window, displaying third application data for the third application in the second display window with the second application data;
   in response to determining that the third application is related to the second application data in the second display window, displaying the third application data for the third application in the first display window with the first application data;
   receiving a fourth application launch request for a fourth application while the third application data is displayed in the first or second display windows; and
   in response to determining that the fourth application is related to the third application data, partitioning the screen and generating a third display window for a newly partitioned screen and displaying fourth application data for the fourth application in the third display window.

2. The method of claim 1, wherein each of the first application and the second application comprises one of an application for a TV service, an application for external input data, an application for IP datagram, an application installed after download, a VOD application, a game application and a web browser application.

3. The method of claim 2, wherein the third application comprises one of an application of the same type of the first or second application and a menu application.

4. The method of claim 3, wherein the fourth application comprises an application of the same type of one of the first to third applications and wherein if the third application comprises the menu application, the fourth application comprises a submenu application.

5. The method of claim 1, wherein one or more display windows are provided to each of the partitioned screens.

6. The method of claim 1, further comprising:
determining whether a maximum number of available partitioned screens is exceeded;
if it is the maximum number of the available partitioned screens as a result of the determination and an additional application launch request is received, displaying a requested application data by generating a separate display window from a screen center or a previously partitioned screen.

7. The method of claim 1, wherein if a received application launch request is related to a currently run application, a corresponding application is displayed in a non-overlapping partitioned screen.

8. The method of claim 1, wherein if a received application launch request is related to a currently run application, a corresponding application is provided as a hierarchical structure through a display window separately generated on a partitioned screen of the currently run application.

9. The method of claim 8, wherein an identifier for identifying the hierarchical structure is displayed, and
wherein an application of a layer other than a most upper layer is switched to a background.

10. A digital device, comprising:
a user interface unit configured to receive first, second, third and fourth application launch requests;
a decoder configured to decode a launch-requested application data;
a controller configured to:
control a first application to be launched,
control a first application data and a second application data to be displayed in a first display window and a second display window, respectively by partitioning a screen into a first display window and a second display window in response to the second application launch request,
receive the third application launch request for a third application while the first application data is displayed in the first display window and the second application data is displayed in the second display window,
in response to determining that the third application is related to the first application data in the first display window, display third application data for the third application in the second display window with the second application data,
in response to determining that the third application is related to the second application data in the second display window, display the third application data for the third application in the first display window with the first application data,
receive a fourth application launch request for a fourth application while the third application data is displayed in the first or second display windows, and
in response to determining that the fourth application is related to the third application data, partition the screen and generate a third display window for a newly partitioned screen and display fourth application data for the fourth application in the third display window.

11. The digital device of claim 10, wherein each of the first application and the second application comprises one of an application for a TV service, an application for external input data, an application for IP datagram, an application installed after download, a VOD application, a game application and a web browser application.

12. The digital device of claim 11, wherein the third application comprises one of an application of the same type of the first or second application and a menu application.

13. The digital device of claim 12, wherein the fourth application comprises an application of the same type of one of the first to third applications and wherein if the third application comprises the menu application, the fourth application comprises a submenu application.

14. The digital device of claim 10, wherein the controller controls one or more display windows to be provided to each of the partitioned screens.

15. The digital device of claim 10, wherein the controller determines whether a maximum number of available partitioned screens is exceeded and wherein if it is the maximum number of the available partitioned screens as a result of the determination and an additional application launch request is received, the controller controls a requested application data to be displayed by generating a separate display window from a screen center or a previously partitioned screen.

16. The digital device of claim 10, wherein if a received application launch request is related to a currently run application, the controller controls a corresponding application to be displayed in a non-overlapping partitioned screen.

17. The digital device of claim 10, wherein if a received application launch request is related to a currently run application, the controller controls a corresponding application to be provided as a hierarchical structure through a display window separately generated on a partitioned screen of the currently run application.

18. The digital device of claim 17, wherein the controller displays an identifier for identifying the hierarchical structure and wherein the controller controls an application of a layer other than a most upper layer to be switched to a background.

* * * * *